United States Patent
Shao et al.

(10) Patent No.: US 9,746,837 B2
(45) Date of Patent: Aug. 29, 2017

(54) INFORMATION CONTROL METHOD AND ELECTRONIC DEVICE

(71) Applicant: Lenovo (Beijing) Co., Ltd., Beijing (CN)

(72) Inventors: Xiang Shao, Beijing (CN); Jinping Yang, Beijing (CN); Qing Liu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 1038 days.

(21) Appl. No.: 13/915,136

(22) Filed: Jun. 11, 2013

(65) Prior Publication Data

US 2013/0331957 A1 Dec. 12, 2013

(30) Foreign Application Priority Data

Jun. 12, 2012 (CN) .......................... 2012 1 0193615
Jun. 12, 2012 (CN) .......................... 2012 1 0193697
Jun. 13, 2012 (CN) .......................... 2012 1 0194788

(51) Int. Cl.
*A63F 9/24* (2006.01)
*G05B 15/02* (2006.01)
*A63F 9/04* (2006.01)

(52) U.S. Cl.
CPC ............ *G05B 15/02* (2013.01); *A63F 9/0468* (2013.01); *A63F 2009/2442* (2013.01); *A63F 2009/2447* (2013.01)

(58) Field of Classification Search
CPC ............................... G05B 15/02; A63F 9/0468
See application file for complete search history.

(56) References Cited

U.S. PATENT DOCUMENTS 5,784,615 A * 7/1998 Lipe ...................... G06F 9/4425
                                                          712/E9.082
5,852,743 A * 12/1998 Yeh ...................... G06F 13/4081
                                                                710/10
6,220,594 B1    4/2001 Peng
(Continued)

FOREIGN PATENT DOCUMENTS

CN          1741640 A        3/2006
CN        101048208 A       10/2007
(Continued)

OTHER PUBLICATIONS

First Chinese Office Action regarding Application No. 201210193697.X dated Apr. 2, 2014. English translation provided by Unitalen Attorneys at Law.
(Continued)

*Primary Examiner* — Corbett B Coburn
(74) *Attorney, Agent, or Firm* — Harness, Dickey & Pierce, P.L.C.

(57) ABSTRACT

The invention discloses an information control method and an electronic device. The information control method is applied to a first electronic device, and the first electronic device is connected with a second electronic device. The method includes: detecting feature information of the first electronic device according to a connection relation between the first electronic device and the second electronic device; and controlling the first electronic device according to the feature information.

36 Claims, 8 Drawing Sheets

(56) References Cited

U.S. PATENT DOCUMENTS

| | | | |
|---|---|---|---|
| 6,331,145 B1* | 12/2001 | Sity | A63F 9/0468 273/138.2 |
| 7,017,905 B2* | 3/2006 | Lindsey | A63F 9/0468 273/138.2 |
| 7,660,688 B2 | 2/2010 | Ishikawa et al. | |
| 8,210,924 B2* | 7/2012 | Hsu | A63F 9/04 273/146 |
| 8,490,971 B2* | 7/2013 | Ouwerkerk | A63F 9/0468 273/138.2 |
| 8,662,995 B2* | 3/2014 | Hawkins | A63F 9/04 463/22 |
| 9,155,958 B2* | 10/2015 | Zylkin | A63F 9/0468 |
| 9,283,471 B2* | 3/2016 | Strzelewicz | A63F 9/04 |
| 9,298,273 B2* | 3/2016 | Shao | G06K 9/0002 |
| 2002/0096626 A1 | 7/2002 | Ishizuka | |
| 2005/0102431 A1* | 5/2005 | Maniatopoulos | G06F 13/385 709/250 |
| 2005/0215312 A1* | 9/2005 | Tresser | A63F 9/0413 463/22 |
| 2008/0065341 A1 | 3/2008 | Ishikawa et al. | |
| 2008/0117851 A1 | 5/2008 | Irie et al. | |
| 2009/0104976 A1 | 4/2009 | Ouwerkerk et al. | |
| 2009/0210101 A1* | 8/2009 | Hawkins | A63F 9/04 700/297 |
| 2012/0302320 A1 | 11/2012 | Kim | |
| 2013/0178275 A1* | 7/2013 | Hawkins | A63F 9/04 463/22 |

FOREIGN PATENT DOCUMENTS

| | | |
|---|---|---|
| CN | 100373218 C | 3/2008 |
| CN | 101140161 A | 3/2008 |
| CN | 101156993 A | 4/2008 |
| CN | 101898037 A | 12/2010 |
| EP | 1807978 A1 | 7/2007 |
| JP | 2008131312 A | 6/2008 |
| JP | 2009279273 A | 12/2009 |
| KR | 101052485 B1 | 7/2011 |
| WO | WO-2007146549 A3 | 12/2007 |

OTHER PUBLICATIONS

First Chinese Office Action regarding Application No. 201210194788.5 dated May 23, 2014. English translation provided by Unitalen Attorneys at Law.

First Chinese Office Action regarding Application No. 201210193615.1 dated Nov. 2, 2014. English translation provided by Unitalen Attorneys at Law.

First German Office Action regarding Application No. 102013106005.6 dated Oct. 20, 2016. English translation provided by Klunker, Schmitt-Nilson, Hirsch European Patent Attorneys.

* cited by examiner

INFORMATION CONTROL METHOD AND ELECTRONIC DEVICE

CROSS-REFERENCE TO RELATED APPLICATIONS

The present application claims priority to Chinese Patent Application Nos. 201210193615.1, filed Jun. 12, 2012, 201210193697.X filed Jun. 12, 2012 and 201210194788.5 filed Jun. 13, 2012 entitled "Information Control Method and Electronic Device", the entire disclosure of which is incorporated herein by reference.

FIELD OF THE INVENTION

The invention relates to the field of data processing, and particularly to an information control method and an electronic device.

BACKGROUND OF THE INVENTION

In people's daily entertainment, dice occupy a very important position. People often use a die to get a random number. For example, when people are playing a game such as "flight chess" or "Monopoly®", the points of the die represent luck and speed of action. Since the points generated by the dice are a random number, i.e. the points may be different each time, people can feel the fun brought from the game, and this effect will be particularly evident when there are multiple players in the game. With the development of electronic technology, in order to enhance entertainment of the use of dice, electronic dice (E-dice) are developed.

For example, when people play the "Monopoly®" game on a tablet computer with electronic dice, the electronic dice can acquire the numerical information of itself via sensors, and then sends the numerical information to the tablet computer by a wireless communication technology. After receiving the numerical information, the tablet computer processes the numerical information automatically, such as displaying the numerical information on a screen, or inputting the numerical information to a corresponding role in the "Monopoly®" game, so that the role can automatically travels and events in the game are automatically triggered, thus improving entertainment experience of the user.

E-dice (Electronic dice) adopt an active manner, such as detecting the direction of the electronic dice using a gravity sensor and performing transmission in a Zigbee (a short-distance wireless communication technology) wireless communication way. In applications, it is possible to detect the orientation of the dice firstly by an acceleration sensor, and then report the points of the dice to a corresponding electronic device via Zigbee, so as to continue playing the game.

In the process of implementing the technical solution in the embodiments of the invention, the inventor found that there exists at least the following technical problems in the prior art.

(1) In the prior art, usually the point information of the dice is directly obtained based on the vector direction of the acceleration sensor in the dice. Therefore, if the electronic device in which the die is set is not placed horizontally, but is placed at a certain angle relative to the horizontal plane, then, the detected vector direction of the acceleration sensor will be changed, leading to a technical problem that the obtained points of the die is inaccurate. Since the points of the dice obtained in the prior art are inaccurate, the electronic device has a poor accuracy and the operation is inconvenient, thus affecting the user experience. For example, when some users throw the dice, the points obtained using a certain throwing method may be better than the points obtained using another throwing method, but since the actual points detected by the electronic device are not the points of the throw of the user, it will undoubtedly affect the use of the user, resulting in inconvenient operation.

(2) In the prior art, the dice and the electronic device are always in a communication state, the power consumption is significantly increased, thus reducing the usage time of the dice.

(3) In the prior art, most of the electronic die adopt "detection mode (6D Detection)", so the information displayed on the electronic device connected with the electronic dice is only the numerical information of the electronic dice, there is only a single game mode, thus leading to a bad entertainment effect. In the prior art, the electronic dice have only one sensor, and the sensor operates with multiple modes running simultaneously therein, which will increase the computational complexity and result in increased data transmission amount, and the micro control unit (MCU) in the electronic dice has large workload, the power consumption of the electronic dice will increase, thus leading to the decrease in usage time of the electronic dice.

SUMMARY OF THE INVENTION

The embodiments of the invention provide an information control method and electronic device, for solving technical problems in the E-dice technique that the information is inaccurate and the power consumption is high.

The invention provides the following technical solution.

An information control method is provided, the information control method is applied to a first electronic device, the first electronic device communicates with a second electronic device, and the method includes: detecting feature information of the first electronic device according to a connection relation between the first electronic device and the second electronic device; and controlling the first electronic device according to the feature information.

Preferably, the first electronic device has a housing, and the housing has at least one face. The step of detecting feature information of the first electronic device according to a connection relation between the first electronic device and the second electronic device includes: detecting whether a first face in the at least one face is in contact with a second face of the second electronic device; when the first face is in contact with the second face, obtaining first parameter information of the first electronic device; and obtaining second parameter information of the second electronic device. The step of controlling the first electronic device according to the feature information includes: correcting the first parameter information based on the second parameter information, thereby obtaining third parameter information of the first electronic device.

The obtaining first parameter information of the first electronic device comprises one of: (a) obtaining, by a first acceleration sensor in the first electronic device, a vector direction of the first acceleration sensor; and (b) obtaining, by a first acceleration sensor in the first electronic device, a vector direction of the first acceleration sensor; and determining point information of the first electronic device based on the vector direction.

The obtaining second parameter information of the second electronic device comprises one of: (a) obtaining second parameter information of the second electronic device that is preset in the first electronic device; and (b) obtaining second parameter information of the second electronic device that is sent by the second electronic device to the first electronic device via a communication module.

The second parameter information is a vector direction of a second acceleration sensor arranged in the second electronic device, or the value of an angle of the second electronic device relative to a first reference object.

Preferably, the first electronic device has at least a first state and a second state, and when the first electronic device is in the first state or in the second state, the first electronic device is not connected with the second electronic device. The step of detecting feature information of the first electronic device according to a connection relation between the first electronic device and the second electronic device includes: when the first electronic device enters a second state from a first state or enters a first state from a second state, acquiring first information of the first electronic device. The step of controlling the first electronic device according to the feature information includes: sending the first information to a second electronic device.

The first state is a rest state and the second state is an activation state.

The step of sending the first information to the second electronic device by the first electronic device comprises one of: (a) the first electronic device sends the first information to the second electronic device for a first number of times, where the time interval of sending the first information is a first length of time; (b) the first electronic device stops sending the first information when receiving, for the first time, an acknowledge receipt message sent from the second electronic device; and (c) the first electronic device stops sending the first information when receiving, for the first time, an acknowledge receipt message sent from the second electronic device; and the first electronic device stops sending the first information when the first electronic device still does not receive an acknowledge receipt message sent from the second electronic device after the first information has been sent to the second electronic device for a second number of times by the first electronic device.

When the first electronic device enters the second state from the first state, and after the first electronic device sends the first information to the second electronic device, the method further includes: closing, by the first electronic device, the connection channel between the first electronic device and the second electronic device.

When the first electronic device enters the first state from the second state, before the first electronic device sends the first information to the second electronic device, the method further includes: establishing a connection channel between the first electronic device and the second electronic device. The step of sending the first information to the second electronic device by the first electronic device includes: sending the first information to the second electronic device via the connection channel by the first electronic device.

The step of establishing a connection channel between the first electronic device and the second electronic device includes: establishing a connection channel between the first electronic device and the second electronic device after the first electronic device enters the rest state from the activation state for a second length of time.

The step of sending the first information to the second electronic device via the connection channel includes: sending the first information to the second electronic device via the connection channel by the first electronic device after the first electronic device enters the first state from the second state for the second length of time.

The step of sending the first information to the second electronic device by the first electronic device includes: broadcasting the first information in a form of broadcasting, so that the second electronic device responses to the broadcast information after receiving the broadcast information, and decodes the broadcast information to obtain the first information.

Preferably, the first electronic device has at least a rest state and a moving state. The step of detecting feature information of the first electronic device according to a connection relation between the first electronic device and the second electronic device includes: when the first electronic device changes from the rest state to the moving state, acquiring, by a first sensor unit of the first electronic device, first information of the first electronic device in the moving state; and when the first electronic device changes from the moving state to the rest state, acquiring, by a second sensor unit of the first electronic device, second information of the first electronic device in the rest state, where the second information is different from the first information. The step of controlling the first electronic device according to the feature information includes: after acquiring the first information, sending the first information to a second electronic device connected with the first electronic device; and after acquiring the second information, sending the second information to the second electronic device. Where the first sensor unit and the second sensor unit are two separate sensor units.

Before acquiring, by a first sensor unit of the first electronic device, first information of the first electronic device in the moving state, the method further includes: controlling the first sensor unit so that the first sensor unit switches from a power-off state to a power-on state.

Before controlling the first sensor unit so that the first sensor unit switches from a power-off state to a power-on state, The method further includes: judging whether the moving state satisfies a first preset condition; and if the moving state satisfies the first preset condition, controlling the first sensor unit so that the first sensor unit switches from the power-off state to the power-on state.

The method further includes: before acquiring, by a second sensor unit of the first electronic device, second information of the first electronic device in the rest state, controlling the second sensor unit so that the second sensor unit switches from a power-off state to a power-on state.

Before controlling the second sensor unit so that the second sensor unit switches from a power-off state to a power-on state, the method further includes: judging whether the rest state satisfies a second preset condition; and if the rest state satisfies the second preset condition, controlling the second sensor unit so that the second sensor unit switches from a power-off state to a power-on state.

The step of sending the first information to a second electronic device connected with the first electronic device includes one of: (a) sending the first information to the second electronic device connected with the first electronic device via a first wireless communication unit; and (b) sending moving state information of the first electronic device in the moving state to the second electronic device connected with the first electronic device.

The step of sending the second information to the second electronic device includes one of: (a) sending the second information to the second electronic device via a first wireless unit; and (b) sending identification information of at least face of the first electronic device in the rest state to the second electronic device.

An electronic device is provided, the electronic device communicates with a second electronic device, and the electronic device includes: a detection unit, adapted to detect feature information of the electronic device according to a connection relation between the electronic device and the second electronic device; and a control unit, adapted to control the electronic device according to the feature information.

Preferably, the electronic device has a housing, and the housing has at least one face. The detection unit includes: a contact information detecting sub-unit, adapted to detect whether a first face in the at least one face is in contact with a second face of the second electronic device; a first obtaining sub-unit, adapted to obtain first parameter information of the electronic device when the first face is in contact with the second face; and a second obtaining sub-unit, adapted to obtain second parameter information of the second electronic device. The control unit includes: a correction sub-unit, adapted to correct the first parameter information based on the second parameter information, thereby obtaining third parameter information of the electronic device.

The first obtaining sub-unit is adapted to perform one of: (a) obtaining, by a first acceleration sensor in the electronic device, a vector direction of the first acceleration sensor; and (b) obtaining, by a first acceleration sensor in the electronic device, a vector direction of the first acceleration sensor; and determining point information of the electronic device based on the vector direction.

The second obtaining sub-unit is adapted to perform one of: (a) obtaining second parameter information of the second electronic device that is preset in the electronic device; and (b) obtaining second parameter information of the second electronic device that is sent to the electronic device via a communication module.

Preferably, the electronic device has at least a first state and a second state, and when the electronic device is in the first state or in the second state, the electronic device is not connected with the second electronic device. The detection unit includes: an acquisition sub-unit adapted to acquire first information of the electronic device when the electronic device enters a second state from a first state or enters a first state from a second state. The control unit includes: a sending sub-unit adapted to send the first information to a second electronic device.

The first state is a rest state and the second state is an activation state.

The sending sub-unit is adapted to perform one of: (a) sending the first information to the second electronic device for a first number of times, where the time interval of sending the first information is a first length of time; (b) stopping sending the first information when receiving, for the first time, an acknowledge receipt message sent from the second electronic device; and (c) stopping sending the first information when receiving, for the first time, an acknowledge receipt message sent from the second electronic device; and stopping sending the first information when the electronic device still does not receive an acknowledge receipt message sent from the second electronic device after the first information has been sent to the second electronic device for a second number of times by the electronic device.

When the electronic device enters the second state from the first state, the electronic device further includes: a processing sub-unit adapted to close the connection channel between the electronic device and the second electronic device.

When the electronic device enters the first state from the second state, the electronic device further includes: a processing sub-unit adapted to establish a connection channel between the electronic device and the second electronic device, where the sending sub-unit is adapted to send the first information to the second electronic device via the connection channel.

The processing sub-unit is adapted to establish a connection channel between the electronic device and the second electronic device after the electronic device enters the rest state from the activation state for a second length of time.

The sending sub-unit is adapted to send the first information to the second electronic device via the connection channel after the electronic device enters the first state from the second state for the second length of time.

The sending sub-unit is adapted to broadcast the first information in a form of broadcasting, so that the second electronic device responses to the broadcast information after receiving the broadcast information, and decodes the broadcast information to obtain the first information.

Preferably, the electronic device has at least a rest state and a moving state. The detection unit include: a first sensor sub-unit, adapted to acquire first information of the electronic device in the moving state; and a second sensor sub-unit, adapted to acquire second information of the electronic device in the rest state. The control unit includes: a sending sub-unit connected with the first sensor sub-unit and the second sensor sub-unit, for sending the first information and the second information to a second electronic device connected with the electronic device; and a control sub-unit connected with the first sensor sub-unit, the second sub-unit and the sending sub-unit, for controlling the sending sub-unit so that the sending sub-unit sends the first information and the second information to the second electronic device connected with the electronic device. Where the first information is different from the second information, and the first sensor sub-unit and the second sub-unit are two separate sensor units.

The control sub-unit is further adapted to: before the first sensor sub-unit acquires first information of the electronic device in the moving state, control the first sensor sub-unit so that the first sensor sub-unit switches from a power-off state to a power-on state.

The electronic device further includes: a first judgment sub-unit connected with the control sub-unit, for judging whether the moving state satisfies a first preset condition. When the moving state satisfies the first preset condition, the control sub-unit controls the first sensor sub-unit so that the first sensor sub-unit switches from a power-off state to a power-on state.

the control sub-unit is further adapted to: before the second sensor sub-unit acquires second information, which is different from first information, of the electronic device in the rest state, control the second sensor sub-unit so that the second sensor sub-unit switches from a power-off state to a power-on state.

The electronic device further includes: a second judgment sub-unit connected with the control sub-unit, for judging whether the rest state satisfies a second preset condition.

When the rest state satisfies the second preset condition, the control sub-unit controls the second sensor sub-unit so that the second senor sub-unit switches from a power-off state to a power-on state.

The sending sub-unit is a first wireless communication unit and is adapted to perform one of: (a) sending the first information and the second information to the second electronic device; (b) sending moving state information of the electronic device in the moving state to the second electronic device; and (c) sending identification information of at least one face of the electronic device in the rest state to the second electronic device.

It can be seen from the above that: in the invention, the feature information of the first electronic device is detected according to a connection relation between the first electronic device and the second electronic device, for example, the feature information is obtained by detecting the contact situation between the first electronic device and the second electronic device or state information of the first electronic device caused by the connection situation (such as whether the first reconciliation device is connected with the second electronic device or not) between the first electronic device and the second electronic device; then, the first electronic device is controlled according to the feature information, where the control may be information acquiring, information output, information processing, etc.

In a technical solution in which the information is output based on the detected contact information between the first electronic device and the second electronic device, i.e. a technical solution in which the first parameter information of the first electronic device is corrected based on the second parameter information of the second electronic device, for example, the obtained points is corrected based on the angle of the tablet computer, which ensures the technical effect of acquiring the first parameter information of the first electronic device accurately. Since in the embodiment, a technical solution in which the first parameter information of the first electronic device is obtained based on usage of an acceleration sensor, the first parameter information can be obtained directly based on the acceleration sensor within the electronic device, without participation of external conditions, thus it has a technical effect of easy to operate. Since in the embodiment, the first parameter information can be corrected by second parameter information that is set in advance, it is unnecessary to acquire the second parameter information every time, thus saving resources for acquiring the second parameter information, and saving time. Since in the embodiment, the second parameter information can be newly reacquired every time the first parameter information is corrected, the obtained second parameter information will be more accurate, thus achieving the technical effect of correcting the first parameter information more accurately so as to obtain more accurate third parameter information.

In the embodiment in which the information input is controlled based on the state information of the first electronic device, when the first electronic device enters a second state from a first state or enters a second state from a first state, the first communication module acquires the first information; and the first communication module sends the first information to the second electronic device. When the state of the first electronic device changes, the first communication module sends the acquired first information to the second electronic device, and when the state of the first electronic device remains unchanged, it is possible for the first communication module to not establish a connection with the second electronic device, which can save the electrical energy at the side of the first electronic device when the state of the first electronic device remains unchanged, thus achieving an energy saving effect.

In the embodiment in which the information is processed based on the state information of the first electronic device, since two sensors are used, with one sensor acquiring the moving state information of the electronic dice in the moving state and the other sensor acquiring point information of the electronic dice in the rest state, and the moving state information and the point information are displayed on an electronic device connected with the electronic dice, the game is more vivid, and the game modes becomes more diverse. Since two sensors are used, with one sensor acquiring the moving state information of the electronic dice in the moving state and the other sensor acquiring point information of the electronic dice in the rest state, the sensor does not need to perform mode switching, thus the information acquired by the sensors can be transferred to and displayed on the electronic device connected with the electronic dice quickly, thus improving the real-time of the electronic dice. Since in the working process of the two sensors, when the electronic dice are in one state, only the sensor that is to acquire information of this state is powered, the power consumption of the electronic dice will be reduced, thus prolonging the usage time of the electronic dice.

BRIEF DESCRIPTION OF THE DRAWINGS

In order to more clearly illustrate the technical solution in the embodiments of the invention or in the prior art, drawings to be used in the descriptions of the embodiments or the prior art will be introduced briefly hereinafter. Apparently, the drawings in the descriptions below are merely some embodiments of the invention. Those skilled in the art can also obtain other drawings from these drawings without any creative efforts.

DETAILED DESCRIPTION OF THE INVENTION

The technical solution in the embodiments of the invention will be described clearly and completely hereinafter in conjunction with the drawings in the embodiments of the invention. Apparently, the embodiments described are only some embodiments of the invention, rather than all embodiments. All other embodiments that can be obtained by those skilled in the art without any creative efforts should fall into the scope of protection of the invention.

Figure 1:
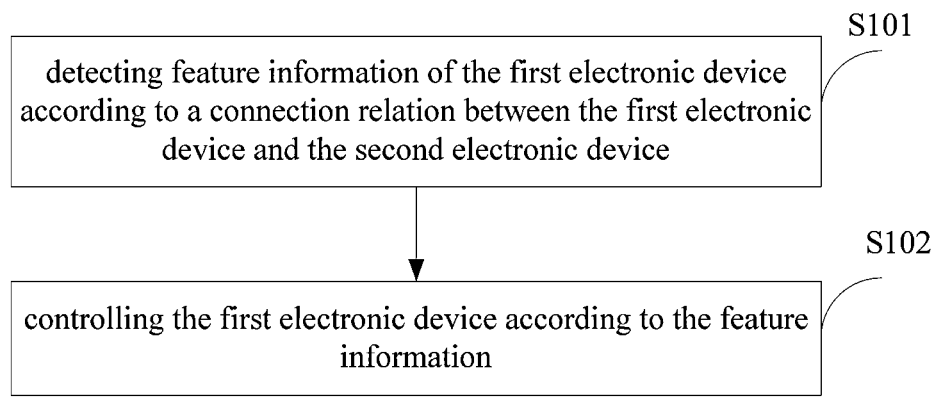
FIG. 1 is a flow chart of an information control method provided by the invention.

Referring to FIG. 1, which is an information control method provided by the invention. The method is applied to a first electronic device, and the first electronic device communicates with a second electronic device. The method includes:

Step S101: detecting feature information of the first electronic device according to a connection relation between the first electronic device and the second electronic device; and Step S102: controlling the first electronic device according to the feature information.

Figure 2:
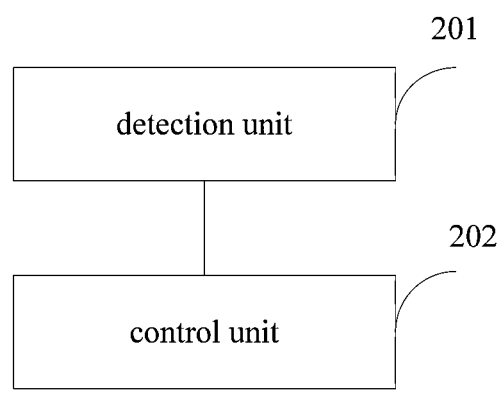
FIG. 2 is a structure diagram of an electronic device for information control provided by the invention.

Corresponding to the method in FIG. 1, the invention also provides an electronic device for information control. FIG. 2 is a structural diagram of an electronic device for information control provided by the invention, and the electronic device is the first electronic device described above, which includes:

a detection unit 201, adapted to detect feature information of the electronic device according to a connection relation between the electronic device and the second electronic device; and a control unit 202, adapted to control the electronic device according to feature information.

It can be seen that, the feature information of the first electronic device is detected according to a connection relation between the first electronic device and the second electronic device, for example, the feature information is obtained by detecting the contact situation between the first electronic device and the second electronic device or state information of the first electronic device caused by the connection situation (such as whether the first reconciliation device is connected with the second electronic device or not) between the first electronic device and the second electronic device; then, the first electronic device is controlled according to the feature information, where the control may be information acquiring, information outputting, information processing, etc.

The feature information of the first electronic device includes but not limited to: contact information between the first electronic device and the second electronic device; information indicating the state of the first electronic device; information of the first electronic device in a certain state.

The invention will be described in detail below in conjunction with specific embodiments.

Firstly, a first embodiment for implementing information acquisition is introduced.

In the first embodiment of the invention, an information acquisition method and an electronic device is provided to solve the technical problem in the prior art that the obtained point information of the dice is inaccurate, which effectively achieves the technical effect of accurately obtaining the point information of the dice.

In order to solve the above problem, the general idea of the technical solution in the first embodiment of the invention is as follows.

Firstly, first parameter information of the first electronic device, such as a vector direction of an acceleration sensor in the dice and point information of the dice, is obtained.

Next, second parameter information of the second electronic device, such as a vector direction of an acceleration sensor of the second electronic device, is obtained.

Then, the first parameter information is corrected based on the second parameter information, so as to ensure the accuracy of the point information of the dice obtained by the technical solution in the embodiment of the invention.

In order to better understand the technical solution described above, the technical solution in the first embodiment is illustrated in detail in conjunction with the drawings in the specification and specific embodiments.

First Example

The first example of the first embodiment of the invention provides an information acquisition method. The method is applied to a first electronic device, and the first electronic device has a housing and at least one face. For example, the first electronic device is a die.

Figure 3:
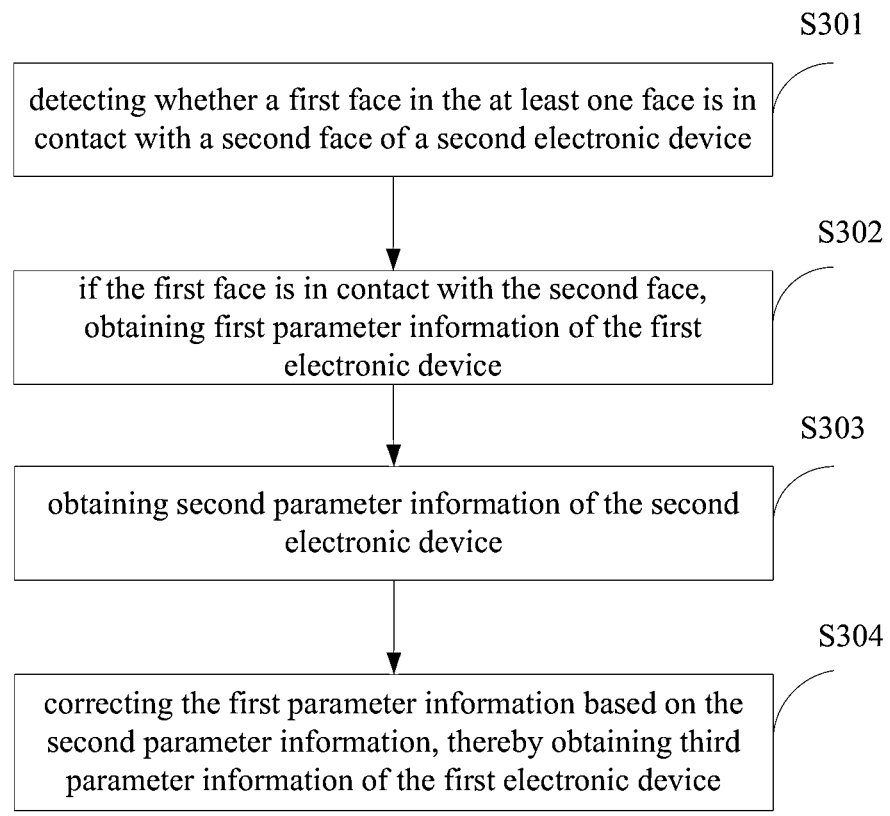
FIG. 3 is a flow chart of an information acquisition method in a first embodiment of the invention.

As shown in FIG. 3, the information acquisition method includes the following steps.

Step S301: detecting whether a first face in the at least one face is in contact with a second face of a second electronic device.

Figure 4:
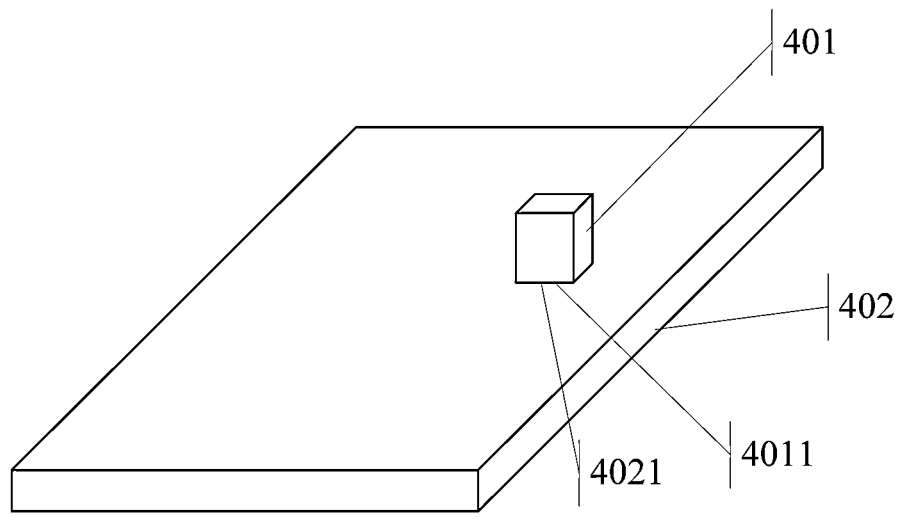
FIG. 4 is a relation diagram between a first electronic device and a second electronic device during interaction in the first embodiment of the invention.

As shown in FIG. 4, the first electronic device is a die 401, the second electronic device is a tablet computer 402. Assuming that a user is playing a flight chess game using the tablet computer, after the die 401 is thrown onto the surface of the tablet computer 402, a contact surface will be formed between the first face 4011 of the die 401 and a second face 4021 of the tablet computer 402 (i.e. the upper surface of the tablet computer 402).

Of course, in the specific implementation process, the second electronic device is not limited to the tablet computer 402, and it may be an integrated machine, a laptop computer and other devices with a touch-sensitive device, which is not defined by the invention. In the subsequent introduction, for ease of introduction, the introduction is made by taking the tablet computer 402 as an example of the second electronic device.

After the step S301 "detecting whether a first face in the at least one face is in contact with a second face of a second electronic device", step S302 can be performed: if the first face is in contact with the second face, obtaining first parameter information of the first electronic device.

In the specific implementation process, in order to obtain first parameter information of the die 401, the die 401 typically includes a first acceleration sensor. For different first parameter information, the obtaining way is different, and two of the obtaining ways are introduced below.

A first case: the first parameter information is a vector direction of the first acceleration sensor. Then, the first parameter information can be obtained according to the following way.

A vector direction of the first acceleration sensor is obtained by the first acceleration sensor.

Assuming that in the case where the die 401 shows different faces, the vector direction of the first acceleration sensor relative to the tablet computer 402 is as follows:

a first face, corresponding to one-point of the die 401, the vector direction is (0,0, −1);

a second face, corresponding to two-point of the die 401, the vector direction is (−1, 0, 0);

a third face, corresponding to three-point of the die 401, the vector direction is (0,0,1);

a fourth face, corresponding to four-point of the die 401, the direction vector is (1,0,0);

a fifth face, corresponding to five-point of the die 401, vector direction is (0, −1, 0); and a sixth face, corresponding to six-point of the die 401, the vector direction is (0,1,0).

Then, once the die 401 is at rest on the surface of the tablet computer 402, the vector direction of the first acceleration sensor in the die 401 can be obtained, thus the face of the die

401 that is the throwing result face can be determined, here it is assumed that the obtained vector direction is (0,0,1).

Figure 5:
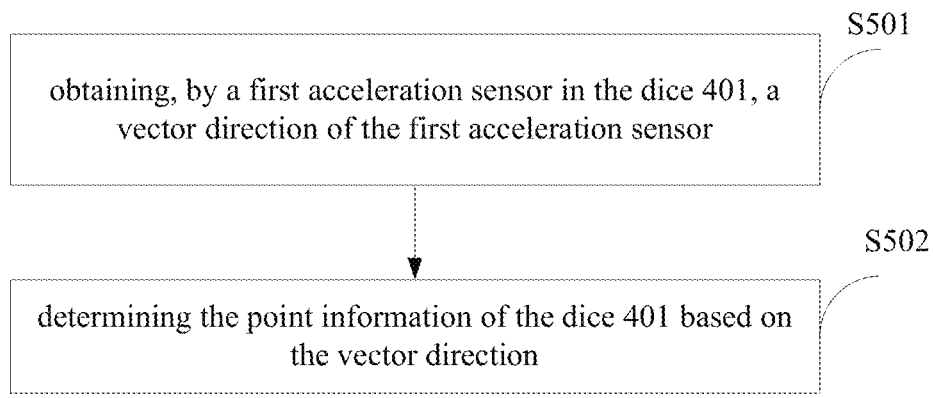
FIG. 5 is a flow chart of acquiring first parameter information in the first embodiment of the invention.

A second case: the first parameter information is the point information of the dice. Then, as shown in FIG. 5, the first parameter information can be obtained in the following way.

Step S501: obtaining, by a first acceleration sensor in the die 401, a vector direction of the first acceleration sensor.

For example, assuming that the vector direction of the first acceleration sensor obtained by the detection of the first acceleration sensor is (1,0,0).

After obtaining the vector direction of the first acceleration sensor based on the step S501, the step S502 can be performed, i.e, determining the point information of the die 401 based on the vector direction.

From the corresponding relation between the vector direction of the first acceleration sensor and the points of the die 401 described above, the throwing result of the dice 401 is: four points.

By using the technical solution in which the first parameter information of the first electronic device is obtained based on the first acceleration sensor, the first parameter information can be obtained directly based on the acceleration sensor within the electronic device, participation of the external conditions is not needed, so it has a technical effect of easy to operate.

Before, while, or after obtaining the first parameter information based on step 301 and step 302, step S303 of obtaining second parameter information of the second electronic device can also be performed.

In the specific implementation process, the second parameter information can be different in a variety of cases, such as:

A first case: in the case where a second acceleration sensor is provided in the tablet computer 402, the second parameter information is a vector direction of the second acceleration sensor provided in the tablet computer 402.

In which, when the angle of the tablet computer 402 relative to a first reference object, such as a horizontal plane, is different, the vector direction of the second acceleration sensor will be different.

Assuming that: in the case where the tablet computer 402 is placed forwardly and is parallel to the horizontal plane, the vector direction of the second acceleration sensor in the tablet computer 402 is (0,0, −1);

in the case where the tablet computer 402 is placed forwardly and has an angle of 30 degrees relative to the horizontal plane, the vector direction of the second acceleration sensor in the tablet computer 402 is (0, −0.856, −0.5); and in the case where the tablet computer 402 is placed forwardly and has an angle of 45 degrees relative to the horizontal plane, the vector direction of the second acceleration sensor in the tablet computer 402 is: (0, −0.717, −0.717).

In the embodiment, the vector direction detected by the second acceleration sensor can be assumed as: (0, −0.856, −0.5).

Of course, in the specific implementation process, it can also be other values, without being limited to the above case.

A second case: the second parameter information is the value of an angle of the tablet computer 402 relative to a first reference object, such as the value of an angle of the tablet computer 402 relative to the horizontal plane.

In the specific implementation process, the value of an angle can be obtained in various ways. As an example, by obtaining the vector direction of the second acceleration sensor, the value of an angle can be obtained based on the corresponding relation between the vector direction and the value of an angle. As an example, the obtained vector direction of the second acceleration sensor is (0, −0.856, −0.5), then corresponding to the vector direction is (0, −0.856, −0.5), the angle of the tablet computer 402 relative to the horizontal plane is 60 degrees. As another example, the value of an angle between the die 401 and the tablet computer 402 is directly measured using an angle measuring instrument. Of course, it is also possible to obtain the value of an angle of the tablet computer 402 relative to a first reference object in other ways, which is not limited by the invention.

In addition, in the specific implementation process, different second parameters can be obtained based on different application environments, without being limited to the above two cases.

In addition, in the specific implementation process, the way for obtaining the second parameter information also includes several cases, and two of the cases are introduced below. Of course, in the specific implementation process, depending on different application environments, different ways can be adopted to obtain the second parameter information.

A first case: second parameter information of the second electronic device that is preset in the first electronic device is obtained.

That is, before using the tablet computer 402, the second parameter information of the tablet computer 402 is obtained firstly by detection, where the second parameter information is preset in a storage of the die 401, and in this way, when the die 401 and the tablet computer 402 are used, the second parameter information can be directly taken to use.

It can be seen from the foregoing description that, when obtaining the second parameter information using the above way, it is not necessary to obtain the second parameter information each time, thereby saving resources for obtaining the second parameter information, and saving time.

A second case: the second parameter information of the second electronic device that is sent via a communication module is obtained.

That is, when using the tablet computer 402 and the die 401, the detection for the second parameter information is performed one time for each throwing, and then the second parameter information is sent to the die 401 via the communication module of the tablet computer 402.

It can be seen from the foregoing description that, when the second parameter information is obtained using the above way, since the second parameter information is reacquired each time when the first parameter information is corrected, the obtained second parameter information will be more accurate, thus achieving the technical effect of correcting the first parameter more accurately so as to obtain more accurate third parameter information.

In the specific implementation process, there is no specified order between the performing of the step S303 and the performing of step S301 and step S302. That is, the step S303 can be performed firstly, then the step S301 and step S302 are preformed; or the step S301 and step S302 are performed firstly; or both the step S303 and the steps S301-S302 are performed simultaneously, which is not limited by the invention.

After obtaining the first parameter information and the second parameter information, the step S304 can be performed, i.e., correcting the first parameter information based on the second parameter information, thereby obtaining third parameter information of the first electronic device.

Based on different first parameter information obtained in step S302 and different second parameter information obtained in step S303, the specific correction process in step S304 is also different, which will be introduced in detail hereinafter.

A first case: the first parameter information is the vector direction of the first acceleration sensor, (0, −0.717,0.717,), and the second parameter information is the vector direction of the second acceleration sensor, (0,0.717 0.717).

Figure 6:
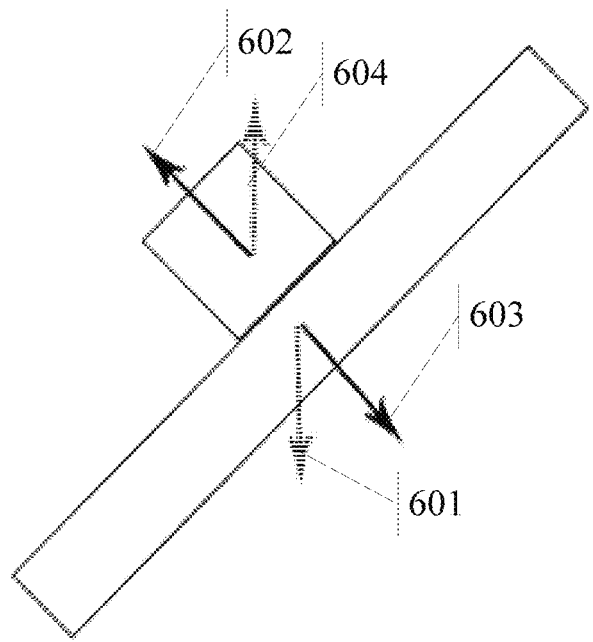
FIG. 6 is a force diagram during correcting the vector direction of a first acceleration sensor based on the vector direction of a second acceleration sensor in the first embodiment of the invention.

As shown in FIG. 6, when there is no angle between the tablet computer 402 and the horizontal plane, the vector direction of the second acceleration sensor will be (0,0, −1), but the actually-obtained vector direction of the second acceleration sensor is (0,0.717,0.717), thus it is clear that the tablet computer 402 rotates counterclockwise by 45 degrees with respect to the horizontal plane, and the same happens to the vector direction of the first acceleration sensor in the die 401, and therefore, in order to perform correcting, the vector direction should be rotated clockwise by 45 degrees, so that the obtained vector direction is (0,0,1), then, from the corresponding relation between the points and the vector direction described previously, the throwing result of the die 401 is three points.

A second case: the first parameter information is the point information. It can be seen from the corresponding relationship between the point information of the die 401 and the vector direction that, one point number corresponds to one vector direction. However, in some cases, in order to avoid slight errors, it may be the following situation: make some vector directions within a certain range correspond to that point number, and then the point number is corrected based on the vector direction of the second acceleration sensor. As an example, if the vector direction of the second acceleration sensor is within a first preset vector value range, the point number will not be changed; if the vector direction of the second acceleration sensor is in a second preset vector value range, the point number will be decreased by 1, and so on.

The way to adjust the first parameter information based on the value of an angle of the tablet computer 402 relative to the horizontal plane is similar to the above-described way.

In the specific implementation process, the adjusting process of adjusting the first parameter value of the dice 402 based on the second parameter value of the tablet computer 402 can be performed in other ways, without being limited to the above situation, which will not be listed in detail herein.

Second Example

The second example of the first embodiment of the invention provides an information acquisition method, the information acquisition method is applied to a second electronic device having a second face, and the second electronic device can communicate with the first electronic device, the first electronic device has a housing having at least one face. Specifically, in the embodiment, the first parameter information of the die 401 is corrected based on the tablet computer 402, and the specific correction process is similar to the correction process of the first parameter information of the die 401 in the previous embodiment.

Figure 7:
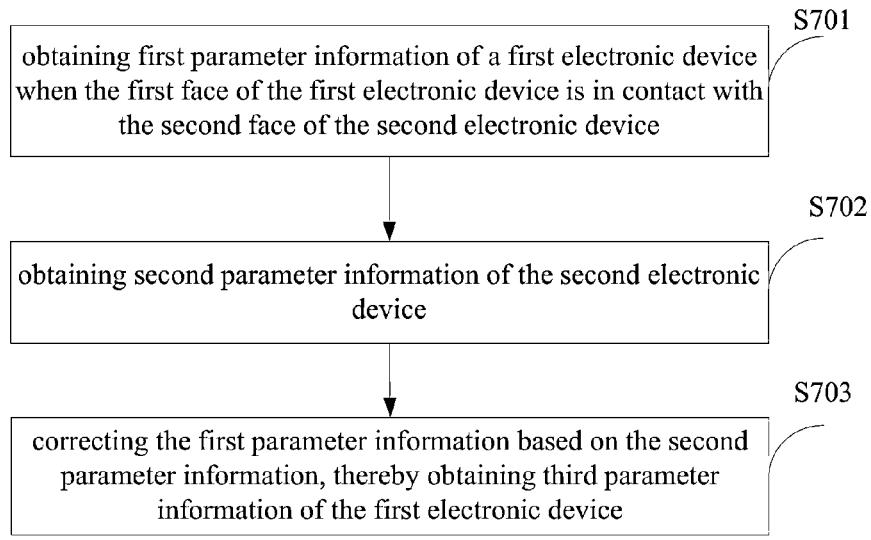
FIG. 7 is a flow chart of an information acquisition method at the side of the second electronic device in the first embodiment of the invention.

As shown in FIG. 7, the information acquisition method includes the following steps.

Step S701: obtaining first parameter information of a first electronic device when the first face of the first electronic device is in contact with the second face of the second electronic device.

In the specific implementation process, in order to obtain the first parameter information of the die 401, the die 401 generally includes a first acceleration sensor. For different first parameter information, the obtaining way may be different. In the following, two of the obtaining ways are introduced.

A first case: the first parameter information is a vector direction of the first acceleration sensor. In this case, the first parameter information can be obtained in the following way:
the vector direction of the first acceleration sensor is obtained by the first acceleration sensor.

Specifically, the vector direction of the first acceleration sensor is obtained by the first acceleration sensor, and then is sent to the tablet computer 402.

A second case: the first parameter information is the point information of the dice. In this case, the first parameter information can be obtained in the following way:
the vector direction of the first acceleration sensor is obtained by a first acceleration sensor in the die 401; and
the point information of the dice is determined based on the vector direction.

Specifically, the vector direction of the first acceleration sensor is obtained by the first acceleration sensor, and is sent to the tablet computer 402; then, the point information of the die 401 is determined in the tablet computer 402, or the point information is determined directly in the die 401 and then is sent to the tablet computer 402.

By using the technical solution in which the first parameter information of the first electronic device is obtained based on the first acceleration sensor, the first parameter information can be obtained directly based on the acceleration sensor in the electronic device, without the participation of the external conditions, so it has a technical effect of easy to operate.

Before, while, or after obtaining the first parameter information based on step S701, step S702 of obtaining second parameter information of the second electronic device can also be performed.

In the specific implementation process, the second parameter information can be different in a variety of cases as follows.

A first case, in the case where a second acceleration sensor is provided in the tablet computer 402, the second parameter information is a vector direction of the second acceleration sensor provided in the tablet computer 402.

In which, when the angle of the tablet computer 402 relative to a first reference object, such as a horizontal plane, is different, the vector direction of the second acceleration sensor will be different.

A second case: the second parameter information is the value of an angle of the tablet computer 402 relative to a first reference object, such as the value of an angle of the tablet computer 402 relative to the horizontal plane.

In the specific implementation process, the value of an angle can be obtained in various ways. As an example, by directly obtaining the vector direction of the second acceleration sensor, the value of an angle can be obtained based on the corresponding relation between the vector direction and the value of an angle. As another example, the value of an angle between the dice 401 and the tablet computer 402 is directly measured using an angle measuring instrument. Of course, it is also possible to obtain the value of an angle of the tablet computer 402 relative to a first reference object in other ways, which is not limited by the invention.

In addition, in the specific implementation process, different second parameters can be obtained based on different application environments, without being limited to the above two cases.

In the specific implementation process, the way for obtaining the second parameter information also includes several cases, and two of the cases are introduced below. Of course, in the specific implementation process, depending on different application environments, different ways can be adopted to obtain the second parameter information.

A first case: second parameter information of the second electronic device that is preset in the first electronic device is obtained.

That is, before using the tablet computer 402, the second parameter information of the tablet computer 402 is obtained firstly by detection, where the second parameter information is preset in the tablet computer 402, and in this way, when the die 401 and the tablet computer 402 are used, the second parameter information can be directly taken to use.

It can be seen from the foregoing description that, when obtaining the second parameter information using the above way, it is not necessary to obtain the second parameter information each time, thereby saving resources for obtaining the second parameter information, and saving time.

A second case: the second parameter information of the second electronic device sent via a communication module is obtained.

That is, when using the tablet computer 402 and the die 401, the detection for the second parameter information is performed one time for each throwing.

It can be seen from the foregoing description that, when the second parameter information is obtained using the above way, since the second parameter information is reacquired each time when the first parameter information is corrected, the obtained second parameter information will be more accurate, thus achieving the technical effect of correcting the first parameter more accurately so as to obtain more accurate third parameter information.

In the specific implementation process, there is no specified order between the performing of the step S702 and the performing of step S701. That is, the step S702 can be performed firstly, then the step S701 is preformed; or the step S701 is performed firstly; or both step S701 and step S702 are performed simultaneously, which is not limited by the invention.

After obtaining the first parameter information and the second parameter information, the step S703 can be performed, i.e., correcting the first parameter information based on the second parameter information, thereby obtaining third parameter information of the first electronic device.

Based on different first parameter information obtained in step S701 and different second parameter information obtained in step S702, the specific correction process in step S703 is also different. Since how to correct the first parameter information based on the second information is introduced in detail in the first embodiment of the invention, it will not be introduced in detail hereinafter.

Third Example

The third example of the first embodiment of the invention provides an electronic device having a housing, and the housing has at least one face. As an example, the electronic device is a die.

The electronic device implemented in the third example is an embodiment of the electronic device shown in FIG. 2. Specifically, the function of the detection unit 201 is achieved by a contact information detecting sub-unit 801, a first obtaining sub-unit 802 and a second obtaining sub-unit 803, and the function of the control unit 202 is achieved by a correction sub-unit 803.

Figure 8:
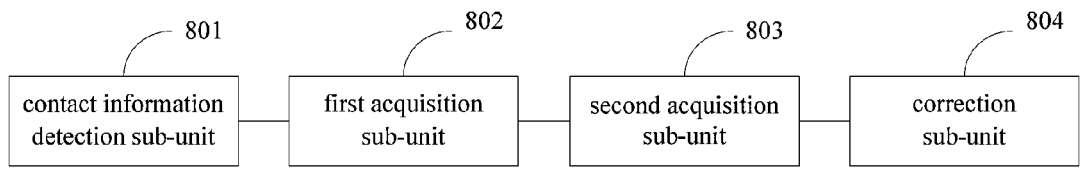
FIG. 8 is a block diagram of a first electronic device in the first embodiment of the invention.

As shown in FIG. 8, the electronic device further includes a contact information detecting sub-unit 801, a first obtaining sub-unit 802 and a second obtaining sub-unit 803.

The contact information detecting sub-unit 801 is adapted to detect whether a first face in the at least one face is in contact with the second face of the second electronic device.

In the subsequent introduction, for convenience of introduction, the electronic device refers to the first electronic device introduced in the first, second examples of the first embodiment of the invention, i.e. the die 401, and the second electronic device refers to the second electronic device listed in the first, second example of the first embodiment of the invention, i.e. the tablet computer 402.

The first obtaining sub-unit 802 is adapted to obtain first parameter information of the electronic device when the first face is in contact with the second face.

In the specific implementation process, in order to obtain first parameter information of the die 401, the die 401 typically includes a first acceleration sensor. For different first parameter information, the function of the first obtaining sub-unit 802 is different, and two cases are introduced hereinafter.

A first case: the first parameter information is a vector direction of the first acceleration sensor. Then, the first obtaining sub-unit 802 is adapted to:

obtain the vector direction of the first acceleration sensor by the first acceleration sensor.

A second case: the first parameter information is the point information of the dice. Then the first obtaining sub-unit 802 is adapted to:

obtain, by a first acceleration sensor in the electronic device, the vector direction of the first acceleration sensor; and determine the point information of the electronic device based on the vector direction.

By using the technical solution in which the first parameter information of the first electronic device is obtained based on the first acceleration sensor, the first parameter information can be obtained directly based on the acceleration sensor in the electronic device, without the participation of the external conditions, so it has a technical effect of easy to operate.

The second obtaining sub-unit 803 is adapted to obtain the second parameter information of the second electronic device.

In the specific implementation process, there is no specified order between the performing of the first obtaining sub-unit 802 and the performing of the second obtaining sub-unit 803. That is, the obtaining order of the first parameter information and the second parameter information is not defined by the invention.

In the specific implementation process, the second parameter information obtained by the second obtaining sub-unit 803 may be different in a variety of cases, such as:

A first case: in the case where a second acceleration sensor is provided in the tablet computer 402, the second parameter information is a vector direction of the second acceleration sensor provided in the tablet computer 402.

In which, when the angle of the tablet computer 402 relative to a first reference object, such as a horizontal plane, is different, the vector direction of the second acceleration sensor will be different.

In the specific implementation process, the second obtaining sub-unit 803 can adopt various ways to obtain the value of an angle. As an example, by directly obtaining the vector direction of the second acceleration sensor, the value of an angle can be obtained based on the corresponding relation between the vector direction and the value of an angle. As another example, the value of an angle between the die 401 and the tablet computer 402 is directly measured using an angle measuring instrument. Of course, it is also possible to obtain the value of an angle of the tablet computer 402 relative to a first reference object in other ways, which is not defined by the invention.

Further, in the specific implementation process, the second obtaining sub-unit 803 can obtain different second parameter based on different application environments, without being limited to the above two cases.

In addition, the specific implementation process, the way of the second obtaining sub-unit 803 obtaining the second parameter information also includes several cases, and two of the cases are introduced below. Of course, in the specific implementation process, depending on different application environments, different ways can be adopted to obtain the second parameter information.

A first case: second parameter information of the second electronic device that is preset in the first electronic device is obtained.

That is, before using the tablet computer 402, the second parameter information of the tablet computer 402 is obtained firstly by detection, where the second parameter information is preset in the die 401, and in this way, when the die 401 and the tablet computer 402 are used, the second parameter information can be directly taken to use.

It can be seen from the foregoing description that, when obtaining the second parameter information using the above way, it is not necessary to obtain the second parameter information each time, thereby saving resources for obtaining the second parameter information, and saving time.

A second case: the second parameter information of the second electronic device sent via a communication module is obtained.

That is, when using the tablet computer 402 and the die 401, the detection for the second parameter information is performed one time for each throwing, and then the second parameter information is sent to the die 401 via the communication module of the tablet computer 402.

It can be seen from the foregoing description that, when the second parameter information is obtained using the above way, since the second parameter information is reacquired each time when the first parameter information is corrected, the obtained second parameter information will be more accurate, thus achieving the technical effect of correcting the first parameter more accurately so as to obtain more accurate third parameter information.

The correction sub-unit 804 is adapted to correct the first parameter information based on the second parameter information, thereby obtaining third parameter information of the electronic device.

Based on different first parameter information and second parameter information, the specific correction process adopted by the correction sub-unit 804 will be different, and for the specific situation, one can refer to the first example of the first embodiment.

Since the electronic device introduced in the third example of the first embodiment of the invention is the electronic device used in the method of the first example of the first embodiment, those skilled in the art can understand the specific implementation way of the electronic device in the third example of the first embodiment of the invention and variation forms thereof based on the method introduced in the first example of the first embodiment of the invention, and therefore the electronic device will not be introduced in detail. All electronic devices for the implementation of the method of the first embodiment of the invention are intended to belong to the scope of protection of the invention.

Fourth Example

The fourth example of the first embodiment of the invention provides an electronic device, the electronic device has a second face, the electronic device can perform data communication with a first electronic device, and the first electronic device has a housing having at least one face.

In the subsequent introduction, for convenience of introduction, the electronic device refers to the second electronic device introduced in the first, second examples of the first embodiment of the invention, i.e. the tablet computer 402, and the first electronic device refers to the first electronic device listed in the first, second example of the first embodiment of the invention, i.e. the die 401.

Figure 9:
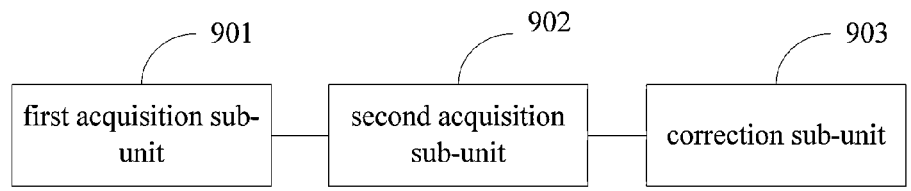
FIG. 9 is a block diagram of a second electronic device in the first embodiment of the invention.

As shown in FIG. 9, the electronic device includes a first obtaining sub-unit 901, a second obtaining sub-unit 902 and a correction sub-unit 903.

The first obtaining sub-unit 902 is adapted to obtain the first parameter information of the first electronic device that is obtained by the first electronic device when the first plate of the first electronic device is in contact with the second face.

In the specific implementation process, in order to obtain first parameter information of the die 401, the die 401 typically includes a first acceleration sensor. For different first parameter information, the function of the first obtaining sub-unit 901 is different, and two cases are introduced hereinafter.

A first case: the first parameter information is a vector direction of the first acceleration sensor. Then, the first obtaining sub-unit 901 is adapted to:

obtain the vector direction of the first acceleration sensor obtained by the first acceleration sensor.

Specifically, the vector direction of the first acceleration sensor is obtained by the first acceleration sensor, and then is sent to the tablet computer 402.

A second case: the first parameter information is the point information of the dice. Then the first obtaining sub-unit 901 is adapted to:

obtain the vector direction of the first acceleration sensor that is obtained by the first acceleration sensor in the die 401; and determine the point information of the dice based on the vector direction.

Specifically, the vector direction of the first acceleration sensor is obtained by the first acceleration sensor, and is sent to the tablet computer 402; then, the point information of the die 401 is determined in the tablet computer 402, or the point information is determined directly in the die 401 and then is sent to the tablet computer 402.

By using the technical solution in which the first parameter information of the first electronic device is obtained based on the first acceleration sensor, the first parameter information can be obtained directly based on the acceleration sensor in the electronic device, without the participation of the external conditions, so it has a technical effect of easy to operate.

The second obtaining sub-unit 902 is adapted to obtain the second parameter information of the electronic device.

In the specific implementation process, the second parameter information obtained by the second obtaining sub-unit 902 may be different in a variety of cases, such as:

A first case, in the case where a second acceleration sensor is provided in the tablet computer 402, the second parameter information is a vector direction of the second acceleration sensor provided in the tablet computer 402.

In which, when the angle of the tablet computer 402 relative to a first reference object, such as a horizontal plane, is different, the vector direction of the second acceleration sensor will be different.

A second case: the second parameter information is the value of an angle of the tablet computer 402 relative to a first reference object, such as the value of an angle of the tablet computer 402 relative to the horizontal plane.

In the specific implementation process, the second obtaining sub-unit 902 can obtain the value of an angle in various ways. As an example, by directly obtaining the vector direction of the second acceleration sensor, the value of an angle can be obtained based on the corresponding relation between the vector direction and the value of an angle. As another example, the value of an angle between the die 401 and the tablet computer 402 is directly measured using an angle measuring instrument. Of course, it is also possible to obtain the value of an angle of the tablet computer 402 relative to a first reference object in other ways, which is not defined by the invention.

In addition, in the specific implementation process, different second parameters can be obtained based on different application environments, without being limited to the above two cases.

In the specific implementation process, the way for obtaining the second parameter information also includes several cases, and two of the cases are introduced below. Of course, in the specific implementation process, depending on different application environments, the ways for the second obtaining sub-unit 902 to obtain the second parameter information may be different, and accordingly, the function of the second obtaining sub-unit 902 will be different.

A first case, the second obtaining sub-unit 902 is adapted to:

obtain the second parameter information of the second electronic device that is preset in the first electronic device.

That is, before using the tablet computer 402, the second parameter information of the tablet computer 402 is obtained firstly by detection, where the second parameter information is preset in the tablet computer 402, and in this way, when the die 401 and tablet computer 402 are used, the second parameter information can be directly taken to use.

It can be seen from the foregoing description that, when the second obtaining terminal 902 obtains the second parameter information using the above way, it is not necessary to obtain the second parameter information each time, thereby saving resources for obtaining the second parameter information, and saving time.

A second way: the second obtaining sub-unit 902 is adapted to:

obtain the second parameter information of the second electronic device that is sent via a communication module.

That is, when using the tablet computer 402 and the die 401, the detection for the second parameter information is performed one time for each throwing.

It can be seen from the foregoing description that, when the second obtaining sub-unit 902 adopts the above way to obtain the second parameter information, since the second parameter information is reacquired each time when the first parameter information is corrected, the obtained second parameter information will be more accurate, thus achieving the technical effect of correcting the first parameter more accurately so as to obtain more accurate third parameter information.

In the specific implementation process, there is no specified order between the performing of the first obtaining sub-unit 901 and the performing the second obtaining sub-unit 902. That is, the obtaining order of the first parameter information and the second transmission line is not defined by the invention.

The correction sub-unit 903 is adapted to correct the first parameter information based on the second parameter information, thereby obtaining third parameter information of the first electronic device.

Based on different first parameter information obtained by the first obtaining sub-unit 902 and different second parameter information obtained by the second obtaining sub-unit 902, the correction process of the correction sub-unit 903 is also different. Since how to correct the first parameter information based on the second information is introduced in detail in the first embodiment of the invention, it will not be introduced in detail hereinafter.

Since the electronic device introduced in the fourth example of the first embodiment of the invention is the electronic device used in the method of the second example of the first embodiment, those skilled in the art can understand the specific implementation way of the electronic device in the fourth example of the first embodiment of the invention and variation forms thereof based on the method introduced in the second example of the first embodiment of the invention, and therefore the electronic device will not be introduced in detail. All electronic devices for the implementation of the method of the first embodiment of the invention are intended to belong to the scope of protection of the invention.

The one or more technical solutions provided by the first embodiment of the invention have at least the following technical effects or advantages.

(1) Since in the first embodiment of the invention, a technical solution in which the first parameter information of the first electronic device is corrected based on the second parameter information of the second electronic device is adopted, for example, the obtained point number is corrected based on the angle of the tablet computer, the technical effect of accurately acquiring the first parameter information of the first electronic device is ensured.

(2) Since in the first embodiment of the invention, the technical solution in which the first parameter information of the first electronic device is obtained based on the acceleration sensor is adopted, i.e. the first parameter information can be obtained directly based on the acceleration sensor in the electronic device without participation of external conditions, it has a technical effect of easy to operate.

(3) Since in the first embodiment of the invention, the first parameter information can be corrected by the preset second parameter information, it is not necessary to obtain the second parameter information each time, thus saving resources for obtaining the second parameter information, and saving time.

(4) Since in the first embodiment of the invention, the second parameter information is reacquired each time when the first parameter information is corrected, the obtained second parameter information will be more accurate, thus achieving the technical effect that the first parameter information can be corrected more accurately to obtain more accurate third parameter information.

(5) Since in the first embodiment of the invention, correction is made to the point number of the dice, the detection accuracy of the electronic device is improved, and the operation is convenient, thus improving user experience greatly.

A second embodiment for implementing the information output method is introduced hereinafter.

Figure 10:
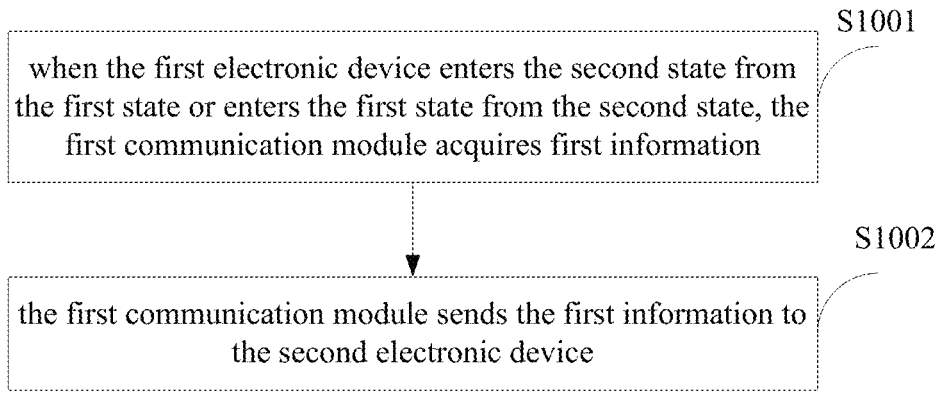
FIG. 10 is a flow chart of information outputting in a second embodiment of the invention.

The information output method in the second embodiment of the invention is as follows: when the first electronic device enters a second sate from a first state or enters a first state from a second state, a first communication module acquires first information; and the first communication module sends the first information to a second electronic device. The first communication module sends the acquired first information to the second electronic device when the state of the electronic device changes, and the establishment of a connection between the first communication module and the second electronic device can become unnecessary when the state of the first electronic device remains unchanged, and in this way, the electrical energy at the side of the first electronic device can be saved during the time that the state of the first electronic device remains unchanged, thus saving energy. The information output method in the second embodiment of the invention is shown in FIG. 10. The method can be adopted in the first electronic device, which has at least a first state and a second state. When the first electric device is in the first state or the second state, the first electric device does no connect with the second electric device. The first electric device may have the first communication module.

Step S1001: when the first electronic device enters the second state from the first state or enters the first state from the second state, the first communication module acquires first information.

In the second embodiment of the invention, the first electronic device may be an electronic die, and the second electronic device may be a PAD (tablet computer). And the usage scenarios may be that: in the game, a user shakes the electronic die, then throws the electronic die onto the display screen of the PAD, so that the PAD can obtain the point information of the die.

The first electronic device and the second electronic device can communicate with each other using Zigbee, or other communication ways can also be used, such as Bluetooth®. In the embodiment of the invention, the illustration is made by taking the Zigbee as an example.

When the first electronic device is always in the first state or always in a second state, the connection channel between the first electronic device and the second electronic device can be closed. In this case, the first communication module of the first electronic device can stop working, thus saving electronic energy effectively. A second communication module can be also provided at the side of the second electronic device, for communicating with the first communication module. The second communication module can be always in a working state, so as to ensure that it can establish a connection channel with the first communication module at any time.

In the second embodiment of the invention, the first state may refer to a rest state, and the second state may refer to an activation state.

When the first electronic device enters a second state from a first state, or enters a first state from a second state, i.e. when the state of the first electronic device changes, the first communication module can acquire the first information of the first electronic device, and send the obtained first information to the second communication module of the second electronic device.

In which, if the first electronic device enters an activation state from a rest state, then the first information may be information for notifying the second electronic device that the connection channel will be closed, i.e. when the first electronic device enters the activation state from the rest state, the first communication module can acquire information generated by the first electronic device that is used to notify the second electronic device that the connection channel will be closed.

If the first electronic device enters the rest state from the activation state, then the first information may be point information or other information of the first electronic device. That is, when the first electronic device enters the rest state from the activation state, the first communication module can acquire point information or other information of the first electronic device.

If the first electronic device enters the rest state from the activation state, and since when in the activation state, the connection channel between the first communication module and the second communication module is closed, i.e. the first communication module does not work, thus before the first electronic device enters the rest state from the activation state, it needs to establish a connection channel between the first communication module and the second communication module.

In the second embodiment of the invention, the first communication module can establishes the connection channel between the first communication module and the second communication module after the first electronic device enters the rest state from the activation state for a second length of time. In this way, the connection channel can be established after the first electronic device reaches a steady state, thus more accurate first information can be obtained.

If it is the first time for the first communication module establishes a connection channel with the second communication module, then the first communication module can broadcast first identification (ID) information of itself in a form of broadcasting; after receiving the broadcast information, the second communication module matches second identification information of itself with the first identification information; if they are matched, the second communication module determines that its connection channel with the first communication module is established successfully, so that after receiving other broadcast information sent from the first communication module, the second communication module can decode the other broadcast information with corresponding decoding information to obtain the specific information sent from the first communication module.

Step S1002: the first communication module sends the first information to the second electronic device.

If the first electronic device enters the rest state from the activation state, then after establishing the connection channel with the second communication module of the second electronic device, the first communication module sends the first information to the second electronic device via the connection channel.

If the first electronic device enters the activation state from the rest state, then there are three cases: In a first case, firstly the first electronic device enters the activation state from the rest state, and at this time a connection channel has been established between the first communication module and the second communication module, then the first electronic device enters the activation state from the rest state again when the connection channel is not closed yet, the first communication module can acquire the first information that notifies the second electronic device that the connection channel will be closed, and sends the first information to the second electronic device via the connection channel, and after or while sending the first information to the second electronic device, the first communication module can close the connection channel. In which, if the connection channel is closed when the first information is sending to the second electronic device, it is possible that the second electronic device does not receive the first information. In a second case, no connection channel has ever been established between the first electronic device and the second electronic device, and when the first electronic device enters the activation state from the rest state, the first communication module can acquire the first information that notifies the second electronic device that the connection channel will be closed, and sends the first information to the second electronic device, while since there is no connection channel at this time, the first information may be discarded after being sent, and the second electronic device may fail to receive this first information. In a third case, firstly, the first electronic device enters the rest state from the activation state, and at this time a connection channel has been established between the first communication module and the second communication module; after the connection channel is closed, the first electronic device enters the activation state from the rest state again, and since there is no connection channel at this time, the first information may be discarded after being sent, the second electronic device may fail to receive this first information.

In which, if the first communication module and the second communication module communicate with each other via Zigbee, then one way to send the first information may be that: the first communication module can broadcast the first information in a form of broadcasting, and after receiving the broadcast information, the second communication module responds to the broadcast information, and decodes the broadcast information after the response, so as to obtain the first information.

If the first electronic device enters the rest state from the activation state, then after the first electronic device sends the first information to the second electronic device, the first communication module can close the connection channel with the second communication module automatically, for saving electrical energy. In which, the first communication module can close the connection channel after the sending of the first information is completed for a third length of time.

If the first electronic device enters the activation state from the rest state, then the first information is information for notifying the second electronic device that the connection channel will be closed. Although the first communication module may have close the connection channel automatically after the first electronic device enters the rest state from the activation state and has completed sending the first information, the information for notifying the second electronic device that the connection channel will be closed is sent again to the second electronic device by the first electronic device when the first electronic device enters the activation state to the rest state, in order to ensure that the connection channel be closed.

In the second embodiment of the invention, when sending the first information, the first communication module can send the first information many times, and the number of sending times can be set according to requirements, for example it can be set as a first number of times. The time interval of sending may be a first length of time. For example, the number of times the information to be sent may be set to 5, and the time interval of sending is 1 second. The repeated sending of the same information for many times can ensure that the first information can be received by the second electronic device, thus reducing packet loss rate.

Since the second electronic device can reply an acknowledge receipt message after receiving the first information, the specific sending times may not be preset. While each time after the first information is sent, once acknowledge receipt message is received, the sending of the first information is stopped; if there is no acknowledge information is received, the first information is sent continuously. The time interval of sending the same first information may a fourth length of time. The fourth length of time may be or not be equal to the first length of time.

Optionally, there may be a second number to be preset: when sending each first information, once acknowledge receipt message is received, the sending of this first information is stopped, if there is still no acknowledge receipt message received after the first information has been sent for a second number of times, the sending of the first information is stopped. The time interval of sending the first information may be a fifth length of time. The fifth length of time may be or not be equal to the first length of time. If there is still no feedback information received after sending the first information for many times, the device may have a fault, and the network resources will be wasted if the first information is sent continuously in this case.

The information output method of the second embodiment of the invention will be introduced hereinafter by several specific examples.

First Example

The first electronic device is an electronic die, the second electronic device is a PAD, and the PAD has a touch screen, and the electronic die can be thrown onto the touch screen. The first communication module at the side of the electronic die may communicate with the second communication module at the side of the PAD via Zigbee.

The electronic die includes a rest state and an activation state. When the electronic die is in the rest state continuously or in the activated state continuously, there is no connection channel between the electronic die and the PAD, and the first communication module at the side of the electronic die side is disabled.

In the first example of the second embodiment, the user shakes the electronic die, i.e. the electronic die firstly is in an activation state, and in this state, the first communication module at the side of the electronic die is disabled.

Thereafter, the user throws the electronic die onto the touch screen of the PAD, i.e. the electronic die enters the rest state from the activation state. In this case, the first communication module can firstly obtain the first information. In the embodiment, the first information may be the point information of the die. In the embodiment, the first communication module can obtain the first information after the electronic die enters the rest state from the activation state for a second length of time, so as to obtain relative accurate point information.

Before the first communication module sends the first information to the second electronic device, the first communication module needs to establish a connection channel with the second communication module in the second electronic device firstly. In the embodiments, it is the first time the first communication module establishes a connection channel with the second communication module. The first communication module can broadcast first identification (ID) information of itself in a form of broadcasting; after receiving the broadcast information, the second communication module matches second identification information of itself with the first identification information; if the first identification information and the second identification information are matched, the second communication module determines that its connection channel with the first communication module is established successfully, so that after receiving other broadcast information sent from the first communication module, the second communication module can decode the other broadcast information with corresponding decoding information to obtain the specific information sent from the first communication module. The connection channel in the embodiment is established successfully.

Since the time that the first communication module acquires the first information and the time to establish the connection channel with the second communication module are almost the same, it can be considered that the first communication module establishes the connection channel with the second communication module after the first electronic device enters the rest state from the activation state for a second length of time.

After the connection channel is successfully established, the first communication module sends the obtained point information to the second communication module via the connection channel, so that the PAD obtains the point information, thus enabling the game to be played.

In the embodiment, the sending times of the first information by the first communication module is preset to be 5, and the time interval of two sendings is the first length of time, which is set to be 1 second. The PAD may reply one acknowledge receipt message each time it receives the first information, and the first communication module does not response to the acknowledge receipt message, and the sending is stopped until the first information has been sent for five times.

After the first communication module stops sending the first information for a third length of time, the first communication module closes the connection channel between the first communication module and the second communication module.

Second Example

The first electronic device is an electronic die, the second electronic device is a PAD, and the PAD has a touch screen, and the electronic die can be thrown onto the touch screen. The first communication module at the side of the electronic die may communicate with the second communication module at the side of the PAD via Zigbee.

The electronic die includes a rest state and an activation state. When the electronic die is in the rest state continuously or in the activated state continuously, there is no connection channel between the electronic die and the PAD, and the first communication module at the side of the electronic die side is in a closed state.

In the second example of the second embodiment, at first, the electronic die is always in a rest state.

Thereafter, the user begins to shake the electronic die, i.e. the electronic die enters the activation state from the rest state. In this case, the first communication module may firstly obtain the first information generated by the electronic die that is used to close the connection channel between the first communication module and the second communication module, and sends the first information to the second electronic device, and since no connection channel exits at this time, the first information may be discarded after being sent, and the second electronic device may fail to receive the first information.

Next, the user throws the electronic die onto the touch screen of the PAD, i.e. the electronic die enters the rest state from the activation state. In this case, the first communication module can firstly obtain the first information. In the embodiment, the first information may be the point information of the die. In the embodiment, the first communication module can obtain the first information after the electronic die enters the rest state from the activation state for a second length of time, so as to obtain relative accurate point information.

Before the first communication module sends the first information to the second electronic device, the first communication module needs to establish a connection channel with the second communication module in the second electronic device firstly. In the embodiments, it is the first time the first communication module establishes a connection channel with the second communication module. The first communication module can broadcast first identification (ID) information of itself in a form of broadcasting; after receiving the broadcast information, the second communication module matches second identification information of itself with the first identification information; if the first identification information and the second identification information are matched, the second communication module determines that its connection channel with the first communication module is established successfully, so that after receiving other broadcast information sent from the first communication module, the second communication module can decode the other broadcast information with corresponding decoding information to obtain the specific information sent from the first communication module. The connection channel in the embodiment is established successfully.

Since the time that the first communication module acquires the first information and the time to establish the connection channel with the second communication module are almost the same, it can also be considered that the first communication module establishes the connection channel with the second communication module after the first electronic device enters the rest state from the activation state for a second length of time.

After the connection channel is successfully established, the first communication module sends the obtained point information to the second communication module via the connection channel, so that the PAD obtains the point information, thus enabling the game to be played.

In the embodiment, the total number of times of sending the first information by the first communication module is not preset, only the following rules is set: once the first communication module receives one acknowledge receipt message sent from the second communication module, the first communication module stops sending the first information to the second communication module.

In this embodiment, the first communication module sends the first information to the second communication module for three times, and the time interval of every two sendings is a first length of time, which is 0.5 second.

Before the first communication module sends the first information to the second communication module for the fourth time, the first communication module receives first acknowledge receipt message sent from the second communication module, then the first communication module stops sending the first information to the second communication module.

After the first communication module stops sending the first information for a third length of time, the first communication module closes the connection channel between the first communication module and the second communication module.

Third Example

The first electronic device is an electronic die, the second electronic device is a PAD, and the PAD has a touch screen, and the electronic die can be thrown onto the touch screen. The first communication module at the side of the electronic die may communicate with the second communication module at the side of the PAD via Zigbee.

The electronic die includes a rest state and an activation state. When the electronic dice is in the rest state continuously or in the activated state continuously, there is no connection channel between the electronic die and the PAD, and the first communication module at the side of the electronic die side is disabled.

In the third example of the second embodiment, the user shakes the electronic die, i.e. the electronic dice firstly is in an activation state, and in this state, the first communication module at the side of the electronic die is in a closed state.

Thereafter, the user throws the electronic die onto the touch screen of the PAD, i.e. the electronic die enters the rest state from an activation state. In this case, the first communication module can firstly obtain the first information. In the embodiment, the first information may be the point information of the die. In the embodiment, the first communication module can obtain the first information after the electronic die enters the rest state from the activation state for a second length of time, so as to obtain relative accurate point information.

Before the first communication module sends the first information to the second electronic device, the first communication module needs to establish a connection channel with the second communication module in the second electronic device firstly. In the embodiments, it is the first time the first communication module establishes a connection channel with the second communication module. The first communication module can broadcast first identification (ID) information of itself in a form of broadcasting; after receiving the broadcast information, the second communication module matches second identification information of itself with the first identification information; if the first identification information and the second identification information are matched, the second communication module determines that its connection channel with the first communication module is established successfully, so that after receiving other broadcast information sent from the first communication module, the second communication module can decode the other broadcast information with corresponding decoding information to obtain the specific information sent from the first communication module. The connection channel in the embodiment is established successfully.

Since the time that the first communication module acquires the first information and the time to establish the connection channel with the second communication module are almost the same, it can also be considered that the first communication module establishes the connection channel with the second communication module after the first electronic device enters the rest state from the activation state for a second length of time.

After the connection channel is successfully established, the first communication module sends the obtained point information to the second communication module via the connection channel, so that the PAD obtains the point information, thus enabling the game to be played.

In this embodiment, the following rule is preset: if the first communication module still does not receive the acknowledge receipt message replied from the second communication module after the first information has been sent by the first communication module for five times, the first communication module stops sending the first information to the second communication module. If the first communication module receives first acknowledge receipt message replied from the second communication module in the midway of sending the first information before finishing the five sendings, the first communication module stops sending the first information to the second communication module. In which, the time interval of every two sending is a first length of time, which is 1 second.

In the embodiment, after the first communication module sends the first information to the second communication module for four times, if the first communication module receives for the first time one acknowledge receipt message replied from the second communication module, then the first communication module stops sending the first information to the second communication module.

After the first communication module stops sending the first information for a third length of time, the first communication module closes the connection channel between the first communication module and the second communication module.

Thereafter, the user picks up the electronic die from the touch screen of the PAD and continues to shake the die, thus the electronic die enters the activation state from the rest state. In this case, the first communication module can firstly obtain the first information generated by the electronic die that is used to close the connection channel between the first communication module and the second communication module of the PAD, and sends the first information to the second electronic device. In this case, since the connection channel has been closed, the first information may be discarded after being sent, and the second electronic device may fail to receive the first information.

Fourth Example

The first electronic device is an electronic die, the second electronic device is a PAD, and the PAD has a touch screen, and the electronic die can be thrown onto the touch screen. The first communication module at the side of the electronic die may communicate with the second communication module at the side of the PAD via Zigbee.

The electronic die includes a rest state and an activation state. When the electronic die is in the rest state continuously or in the activated state continuously, there is no connection channel between the electronic die and the PAD, and the first communication module at the side of the electronic die side is disabled.

In the fourth example of the second embodiment, the user shakes the electronic die, i.e. the electronic die firstly is in an activation state, and in this state, the first communication module at the side of the electronic die is disabled.

Thereafter, the user throws the electronic die onto the touch screen of the PAD, i.e. the electronic die enters the rest state from the activation state. In this case, the first communication module can firstly obtain the first information. In the embodiment, the first information may be the point information of the die. In the embodiment, the first communication module can obtain the first information after the electronic die enters the rest state from the activation state for a second length of time, so as to obtain relative accurate point information.

Before the first communication module sends the first information to the second electronic device, the first communication module needs to establish a connection channel with the second communication module in the second electronic device firstly. In the embodiments, it is the first time the first communication module establishes a connection channel with the second communication module. The first communication module can broadcast first identification (ID) information of itself in a form of broadcasting; after receiving the broadcast information, the second communication module matches second identification information of itself with the first identification information; if the first identification information and the second identification information are matched, the second communication module determines that its connection channel with the first communication module is established successfully, so that after receiving other broadcast information sent from the first communication module, the second communication module can decode the other broadcast information with corresponding decoding information to obtain the specific information sent from the first communication module. The connection channel in the embodiment is established successfully.

Since the time that the first communication module acquires the first information and the time to establish the connection channel with the second communication module are almost the same, it can also be considered that the first communication module establishes the connection channel with the second communication module after the first electronic device enters the rest state from the activation state for a second length of time.

After the connection channel is successfully established, the first communication module sends the obtained point information to the second communication module via the connection channel, so that the PAD obtains the point information, thus enabling the game to be played.

In this embodiment, the following rule is preset: if the first communication module still does not receive the acknowledge receipt message replied from the second communication module after the first information has been sent by the first communication module for five times, the first communication module stops sending the first information to the second communication module. If the first communication module receives first acknowledge receipt message replied from the second communication module in the midway of sending the first information before finishing the five sendings, the first communication module stops sending the first information to the second communication module. In which, the time interval of every two sending is a first length of time, which is 1 second.

In this embodiment, if the first communication module still does not receive the acknowledge receipt message replied from the second communication module after the first information has been sent for five times by the first communication module, the first communication module will stop sending the first information to the second communication module.

After the first communication module sends the first information for a sixth length of time, the user picks up the electronic die from the touch screen of the PAD and continues to shake the electronic die, thus the electronic die enters the activation state from the rest state again. At this time since the first communication module closes the connection channel between the first communication module and the second communication module until the first communication module stops sending the first information for a third length of time, and in the embodiment the sixth length of time is less than the third length of time, i.e. the electronic die enters the activation state from the rest state again before the connection channel is still not closed.

After that, in this case, the first communication module can firstly obtain the first information generated by the electronic die that is used to close the connection channel between the first communication module and the second communication module of the PAD, and sends the first information to the second electronic device via the connection channel.

Figure 11:
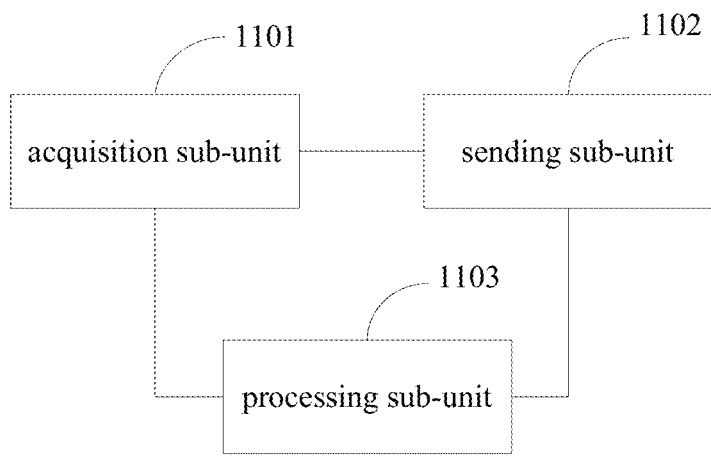
FIG. 11 is a detailed structure diagram of a first electronic device in the second embodiment of the invention.

Referring to FIG. 11, the second embodiment of the invention also provides an electronic device. The electronic device can be called "first electronic device". The first electronic device may include at least a first state and a second state. When the electronic device is in the first state or in the second state, the first electronic device is not connected with the second electronic device. The first electronic device may have a first communication module.

The electronic device shown in FIG. 11 is a specific implementation of the electronic device shown in FIG. 2. In which, the function of the detection unit 201 is achieved by an acquisition sub-unit 1101, the function of the control unit 202 is achieved by a sending sub-unit 1102. It can be understood that the detection unit 201 and the control unit 202 can be achieved by the first communication module.

The first communication module may include the acquisition sub-unit 1101 and the sending sub-unit 1102. The first communication module may also include a processing sub-unit 1103. In the second embodiment of the invention, the first state may be a rest state, and the second state may be an activation state.

The acquisition sub-unit 1101 can be used by the first communication module to obtain the first information when the first electronic device enters the second state from the first state or enters the first state from the second state.

The sending sub-unit 1102 can be used to send the first information to the second electronic device.

Specifically, the sending sub-unit 1102 is adapted to send the first information to a second communication module in the second electronic device for a first number of times, where the time interval between every two sendings is a first length of time.

Specifically, the sending sub-unit 1102 is adapted to stop sending the first information when receiving for the first time one acknowledge receipt message sent from the second communication module.

Specifically, the sending sub-unit 1102 is adapted to stop sending the first information when receiving for the first time one acknowledge receipt message sent from the second communication module, and to stop sending the first information when the first communication module still does not receive the acknowledge receipt message sent from the second communication module after the first information has been sent to the second communication module in the second electronic device by the first communication module for a second number of times.

Specifically, the sending sub-unit 1102 is adapted to send the first information to the second communication module via the connection channel.

Specifically, the sending sub-unit 1102 is adapted to send the first information to the second communication module via the connection channel when the first electronic device enters the first state from the second state for a second length of time.

Specifically, the sending sub-unit 1102 is adapted to broadcast the first information via a form of broadcasting, so that the second communication module response to the broadcast information after receiving the broadcast information, and establishes the connection channel with the first communication module.

The processing sub-unit 1103 is adapted to close the connection channel between the first communication module of the first electronic device and the second communication module of the second electronic device when the first electronic device enters the second state from the first state.

The processing sub-unit 1103 is adapted to establish the connection channel between the first communication module of the first electronic device and the second communication module of the second electronic device when the first electronic device enters the second state from the first state.

Specifically, the processing sub-unit 1103 is adapted to establish the connection channel between the first communication module of the first electronic device and the second communication module of the second electronic device when the first electronic device enters the rest state from the activation state for a second length of time.

The information output method in the second embodiment of the invention is as follows: the first acquires the first information when the first electronic device enters the second state from the first state or enters the first state from the second sate; and the first communication module sends the first information to the second electronic device. When the state of the first electronic device changes, the first communication module sends the first information to the second electronic device, while when the state of the first electronic device remains unchanged, it is possible for the first communication module to not establish a connection with the second electronic device, and in this way, the electrical energy at the side of the first electronic device can be saved when the state of the first electronic device remains unchanged, thus achieving an energy saving effect.

In the second embodiment of the invention, the first electronic device can sends the first information to the second electronic device for many times, so as to ensure that the first information can be received by the second electronic device, thus reducing the packet loss rate.

Optionally, the first electronic device stops sending the first information once it receives one acknowledge receipt message sent from the second electronic device, so as to reduce the waste in network resources while ensuring that the second electronic device can receive the first information.

In the second embodiment of the invention, after entering the activation state from the rest state, the first electronic device can sends to the second electronic device information which is used to notify the second electronic device that the connection channel will be closed, so as to ensure the connection channel be closed.

Finally, a third embodiment of the invention for implementing the information processing/displaying method is introduced.

The third embodiment of the invention provides an information processing method and an information displaying method to solve the problem in the prior art that the game mode is single in the electronic dice games.

The technical solution in the third embodiment of the invention is provided to solve the problem of a single mode of the game, and the general idea of which is as follows.

Two sensors are provided in one electronic die, and the two sensors adopt different modes, to acquire information of the electronic die in different states, and sends the information to an electronic device connected with the electronic die, and meanwhile, the electronic device displays the received information on a display unit, so that the information displayed on the electronic device includes not only the point information of the electronic die, but also the moving state information of the electronic die in the moving state, so that the game is more vivid and the game modes are diversified.

In order to make those skilled in the art understand the invention clearly, the technical solution of the third embodiment is illustrated herein after in detail by specific examples in conjunction with the drawings.

First Example

Figure 12:
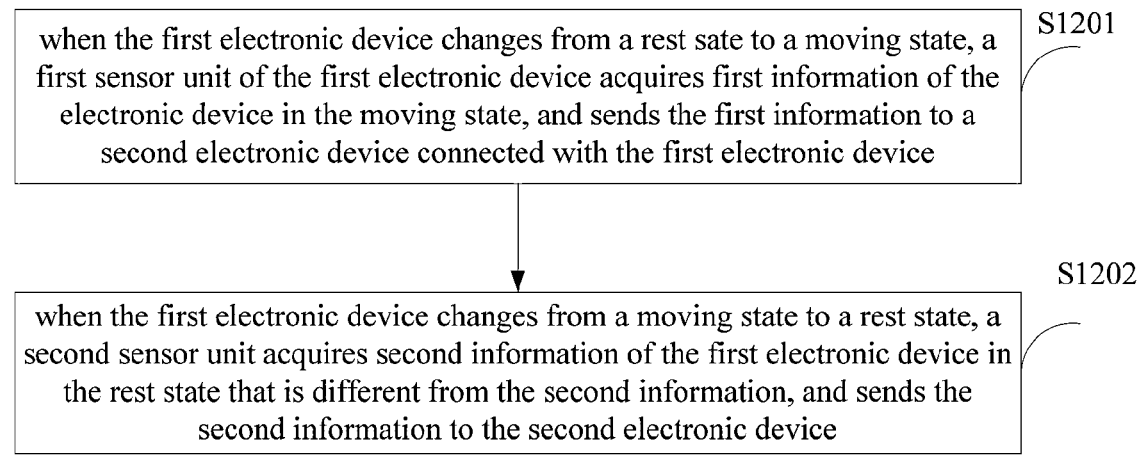
FIG. 12 is a flow chart of an information processing method in a third embodiment of the invention.

The first example of the third embodiment provides an information processing method, and the method is applied to a first electronic device, the first electronic device includes at least a rest state and a moving state. Referring to FIG. 12, which shows a flow chart of the information processing method, in which the method includes the following steps.

Step S1201: when the first electronic device changes from a rest sate to a moving state, a first sensor unit of the first electronic device acquires first information of the electronic device in the moving state, and sends the first information to a second electronic device connected with the first electronic device; and Step S1202: when the first electronic device changes from a moving state to a rest state, a second sensor unit acquires second information of the first electronic device in the rest state that is different from the second information, and sends the second information to the second electronic device.

Where the first sensor unit is a sensor unit different from the second sensor.

Second Example

Figure 13:
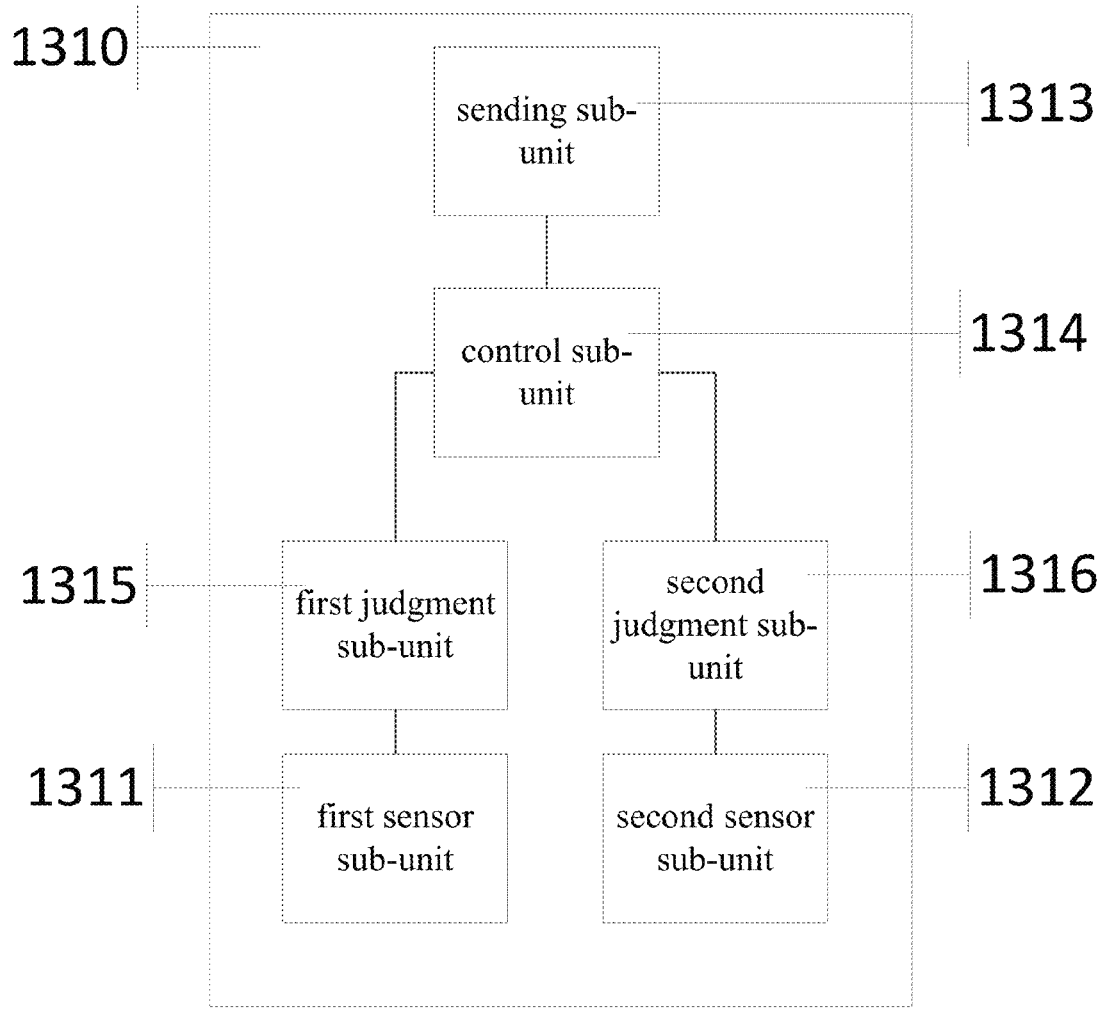
FIG. 13 is a functional module diagram of a first electronic device in the third embodiment of the invention.

The second example of the third embodiment provides an electronic device. In practical applications, the electronic device may be an electronic die, and may also be other electronic devices having the same function. The electronic device shown in FIG. 13 is a specific embodiment of the electronic device shown in FIG. 2. Specifically, the function of the detection unit 201 is achieved by a first sensing sub-unit 1311 and a second sensing sub-unit 1312; the function of the control unit 202 is achieved by a sending sub-unit 1313 and a control sub-unit 1314. Referring to FIG. 13, which is a functional module diagram of the electronic device 1310, in which the electronic device 1310 includes at least a rest state and a moving state. The electronic device 1310 includes: a first sensing sub-unit 1311, adapted to obtain first information of the electronic device 1310 in a moving state; a second sensing sub-unit 1312, adapted to obtain second information of the electronic device 1310 in a rest state; a sending sub-unit 1313 which is connected with the first sensing sub-unit 1311 and the second sensing sub-unit 1312 and is adapted to send the first information and the second information to the second electronic device connected with the electronic device 1310; and a control sub-unit 1314 which is connected with the first sensing sub-unit 1311 and the second sensing sub-unit 1312 and is adapted to control the sending sub-unit 1313 to send the first information and the second information to the second electronic device connected with the electronic device 1310.

The specific implementation process of the information processing method provided in the first example of the third embodiment and the specific working principle of the electronic device in the second example are introduced in detail hereinafter in conjunction with FIG. 12 and FIG. 13.

The information processing method provided in the first example of the third embodiment can be applied to the electronic device 1310. In the following descriptions, the electronic device 1310 is described in detail by taking the electronic die as an example of the electronic device 1310.

In the step S1210 of the information processing method provided by the first example of the third embodiment, before the first sensor sub-unit of the first electronic device acquires the first information of the first electronic device in the moving state, the method further includes: controlling the first sensor sub-unit to switch from a power-off state to a power-on state. Specifically, before the first sensor sub-unit 1311 acquires the first information of the electronic die in the moving state, the first sensor sub-unit 1311 is controlled to switch from a power-off state to a power-on state. That is to say, when the electronic die is in the rest state, the first sensor sub-unit 1311 is in a power-off state, and when the electronic die changes from a rest state to a moving state, the control sub-unit 1314 controls the first sensor sub-unit 1311 to switch from the power-off state to the power-on state, which can avoid unwanted power consumption due to the first sensor sub-unit 1311 being always in the power-on state, so that the first sensor sub-unit 1311 can be in the power-on state only when required, thus increasing the usage time of the electronic dice.

In order to better reflect the actual usage of the electronic die, before the step of controlling the first sensor sub-unit to switch from the power-off state to the power-on state, the information processing method further includes: judging whether the moving state satisfies a first preset condition; if the moving state satisfies the first preset condition, controlling the first sensor sub-unit so that the first sensor sub-unit switches from the power-off state to the power-on state. Specifically, before the control sub-unit 1314 controls the first sensor sub-unit 1311 to switch from the power-off state to the power-on state, a first judgment sub-unit of the electronic die judges whether the moving state of the electronic die satisfies the first preset condition, and if the moving state of the electronic die satisfies the first preset condition, the control sub-unit 1314 controls the first sensor sub-unit so that the first sensor sub-unit switches from the power-off state to the power-on state. That is to say, even if the electronic die changes from a rest state to a moving state, there is a requirement as follows: the electronic die needs to be judged by the first judgment sub-unit on whether the current moving state of the electronic die satisfies the first preset condition, and only in the case that the first preset condition is satisfied, the control sub-unit 1314 controls the first sensor sub-unit 1311 so that the first sensor sub-unit 1311 switches from the power-off state to the power-on state. In practical applications, the switching from a rest state to a moving state of an electronic die may be caused by the user inadvertently. For example, the user accidentally touches the electronic die slightly, the moving time of the electronic die is very short in this case, at this time if the first sensor sub-unit 1311 is to acquire the current first information of the electronic die, the result will not be the one the user wanted, it is useless information for the game that the user is playing. Therefore, at this time if a judgment is made by the first judgment sub-unit to judge whether there is a need to control the first sensor sub-unit 1311 to switch from the power-off state to the power-on state, the electronic die will be very smart, i.e. it does not obtain information that the user unwanted. The first preset condition can be set by those skilled in the art according to actual situation, and will not be defined herein.

In the step S1202 of the information processing method provided by the first example of the third embodiment, before the step of acquiring, by the second sensor sub-unit of the first electronic device, second information of the first electronic device in the rest state that is different from the first information, the method further includes: controlling the second sensor sub-unit so that the second sensor sub-unit switches from the power-off state to the power-on sate. Specifically, before the second sensor sub-unit 1312 acquires the second information of the electronic die in the rest state that is different from the first information, the second sensor sub-unit 1312 is controlled to switch from the power-off state to the power-on state. That is to say, when the electronic die is in a moving state, the second sensor sub-unit 1312 is in a power-off state, and when the electronic die switches from the moving state to the rest state, the control sub-unit 1314 controls the second senor sub-unit 1312 so that the second sensor sub-unit 1312 switches from the power-off state to the power-on state, which can avoid unnecessary power consumption caused by the second sensor sub-unit 1312 being always in the power-on state, so that the second sensing sub-unit 1312 is energized only when needed, thus improving the usage time of the electronic die.

Similarly, in order to better reflect the actual application of the electronic die, before the step of controlling the second sensor sub-unit to switch from the power-off state to the power-on state, the information processing further includes: judging whether the rest state satisfies a second preset condition; and if the moving state satisfies the second preset condition, controlling the second sensor sub-unit to switch from the power-off state to the power-on state. Specifically, before the control sub-unit 1314 controls the second sensor sub-unit 1312 to switch from the power-off state to the power-on state, the second judgment sub-unit of the electronic die judges whether the rest state of the electronic dice satisfies the second preset condition, and only if the rest state of electronic die satisfies the second preset condition, the control sub-unit 1314 controls the second sensor sub-unit 1312 so that the second sensor sub-unit 1312 switches from the power-off state to the power-on state. That is to say, even if the electronic die changes from the moving state to the rest state, a judgment needs to be made by the second judgment sub-unit on whether the moving state of the electronic die satisfies the second preset condition, and only when the second preset condition is satisfied, the control sub-unit 1314 controls the second sensor sub-unit 1312 so that the second sensor sub-unit 1312 switches from the power-off state to the power-on state. In practical applications, the switching from the moving state to the rest state of the electronic die may be caused by the user inadvertently, for example, the electronic die is stuck in a gap, and in this case, although the electronic dice may be in the rest state for a short period of time, but the rest state is unstable, and the state may change at any time, so the second information of the electronic die that is acquired by the second sensor sub-unit 1312 may not be the result that the user wanted, and it is useless information for the game that the user is playing. Therefore, at this time if a judgment is made by the second judgment sub-unit to judge whether there is a need to control second first sensor sub-unit 1312 to switch from the power-off state to the power-on state, the electronic die will be very smart, i.e. it does not obtain information that the user unwanted. The second preset condition can be set by those skilled in the art according to actual situation, and will not be defined herein.

In step S1201, the sending the first information to a second electronic device connected with the first electronic device may include: sending the first information to a second electronic device connected with the first electronic device via a first wireless communication unit. Specifically, the electronic die sends the first information to a second electronic device connected with the electronic die via a sending sub-unit 1314. In practical applications, it can refer to: the electronic die sends the first information to a second electronic device connected with the electronic die via a first wireless communication unit. Of course, other sending ways can be adopted. Those skilled in the art can select appropriate sending ways according to actual situations, which will not be listed in detail herein.

In step S1201, the sending the first information to a second electronic device connected with the first electronic device may include: sending the moving state information of the electronic device in the moving state to a second electronic device connected with the first electronic device. Specifically, it can refer to: sending the moving state information of the electronic die in the moving state to a second electronic device connected with the electronic die. That is to say, the sending the first information to the second electronic device refers to sending the moving state information of the electronic die to the second electronic device. In practical application, the moving state information may be the moving speed information of the electronic die in the moving state, or may be the flip direction of the electronic die. Of course, the moving state information herein can also be other information for describing the moving state of the electronic die. Those skilled in the art can set different contents for the moving state information according to actual situations, which will not be listed in detail herein. These information may include real-time moving information of the electronic die, and when the first information is displayed on the first electronic device, the user can see the real-time moving state of the electronic die, thus making the game more vivid and enhancing the diversity of game modes.

In step S1202, the sending the second information to the second electronic device may include: sending the second information to the second electronic device via a first wireless unit. Specifically, it can refer to: the electronic die sends the second information to a second electronic device connected with the electronic die via a first wireless communication unit. In practical applications, the sending the second information to the second electronic device via a first wireless communication unit herein is similar to the sending the first information via a first wireless communication unit described previously. And for conciseness of the specification, the applicant will not introduce this herein in detail.

In step S1202, the sending the second information to the second electronic device may include: sending identification information of the at least one face of the first electronic device in the rest state to the second electronic device. Specifically, it can refer to: the electronic die sends the identification information of at least one face of the electronic die in the rest state to a second electronic device via the sending sub-unit 1314. In practical applications, the electronic die can have multiple faces, and each face can have corresponding identification information, and here the identification information sent to the second electronic device refers to identification information of one or more faces on the electronic die. For example, the multiple faces of the electronic die are identified by 1,2, 3, 4 . . . , and here the second information refers to the identification information of 1, 2, 3, 4 . . . , identified on the faces of the electronic die. Of course, the identification information can also be set by those skilled in the art according to actual situations.

Third Example

Figure 14:
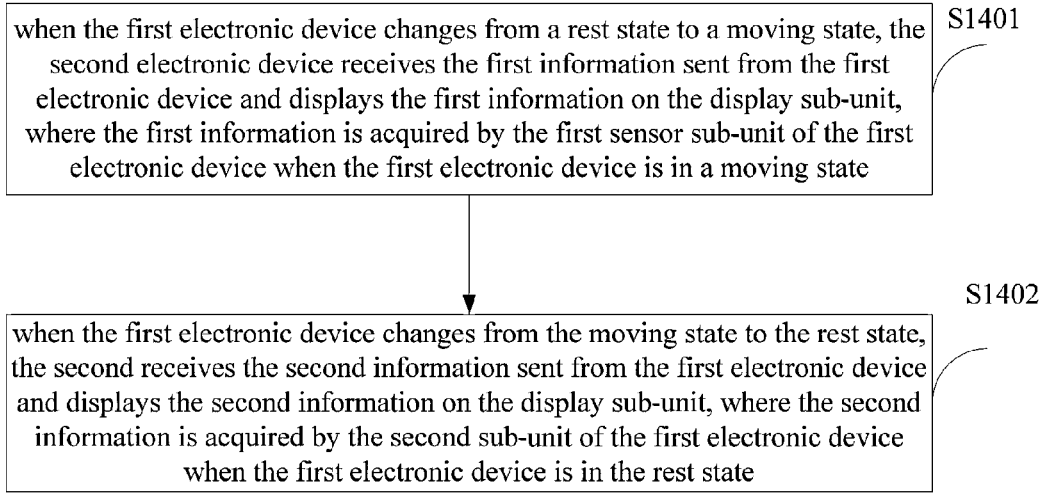
FIG. 14 is a flow chart of an information display method in the third embodiment of the invention.

The third example of the third embodiment provides an information display method, the information display method is applied to a second electronic device includes a display sub-unit, the second electronic device is connected with the first electronic device, and the electronic device has at least a rest state and a moving state. Referring to FIG. 14, which is a flow chart of the information display method, the method includes steps as follows.

Step S1401: when the first electronic device changes from a rest state to a moving state, the second electronic device receives the first information sent from the first electronic device and displays the first information on the display sub-unit, where the first information is acquired by the first sensor sub-unit of the first electronic device when the first electronic device is in a moving state; and Step S1402: when the first electronic device changes from the moving state to the rest state, the second receives the second information sent from the first electronic device and displays the second information on the display sub-unit, where the second information is acquired by the second sub-unit of the first electronic device when the first electronic device is in the rest state, wherein the first information is different from the second information, and the first sensor sub-unit and the second sensor sub-unit are two separate sensor sub-units.

In the third embodiment, the second electronic device receiving the first information sent from the first electronic device includes the second electronic device receiving the first information via a second wireless communication sub-unit; or the second electronic device receiving the second information sent from the first electronic device includes the second electronic device receiving the second information via a second wireless communication unit.

In step S1401, the second electronic device receiving the first information sent from the first electronic device and displaying the first information on the display sub-unit may include: the second electronic device receiving the moving state information of the first electronic device in a moving state that is sent from the first electronic device, and displaying the moving state information on the display sub-unit.

In step S1402, the second electronic device receiving the second information sent from the first electronic device and displaying the first information on the display sub-unit may include: the second electronic device receiving identification information of at least one face of the first electronic device in the rest state that is sent from the first electronic device, and displaying the identification information on the display sub-unit.

In the following description, the invention is described by taking an electronic die as an example of the first electronic device and taking a tablet computer as an example of the second electronic device. Of course, in practical applications, the first electronic device can also be other electronic device having the same function, and the second electronic device can also be other electronic devices having the same function.

When the electronic die changes from a rest state to a moving state, the tablet computer receives the first information sent from the electronic die and displays the first information on the display sub-unit. In practical application, the first information may refer to moving state information for describing the moving state of an electric device. Specifically, moving state information may be the moving speed information of the electronic die in the moving state, or may be the flip direction of the electronic die. Of course, the moving state information herein can also be other information for describing the moving state of the electronic die. Those skilled in the art can set different contents for the moving state information according to actual situations, which will not be listed in detail herein. These information may include real-time moving information of the electronic die, and when the first information is displayed on the first electronic device, the user can see the real-time moving state of the electronic die, thus making the game more vivid and enhancing the diversity of game modes.

When the electronic die changes from a moving state to a rest state, the tablet computer receives the second information sent from the electronic die and displays the second information on the display sub-unit. In practical applications, the electronic die can have multiple faces, the second information may refer to the corresponding identification information of each face, and here the sending the second information sent to the tablet computer may refer to sending the identification information of one or more faces of the electronic die. For example, the multiple faces of the electronic die are identified by 1, 2, 3, 4 . . . , and here the second information refers to the identification information of 1, 2, 3, 4 . . . , identified on the faces of the electronic die. Of course, the identification information can also be set by those skilled in the art according to actual situations, which will not be described in detail herein.

Fourth Example

Figure 15:
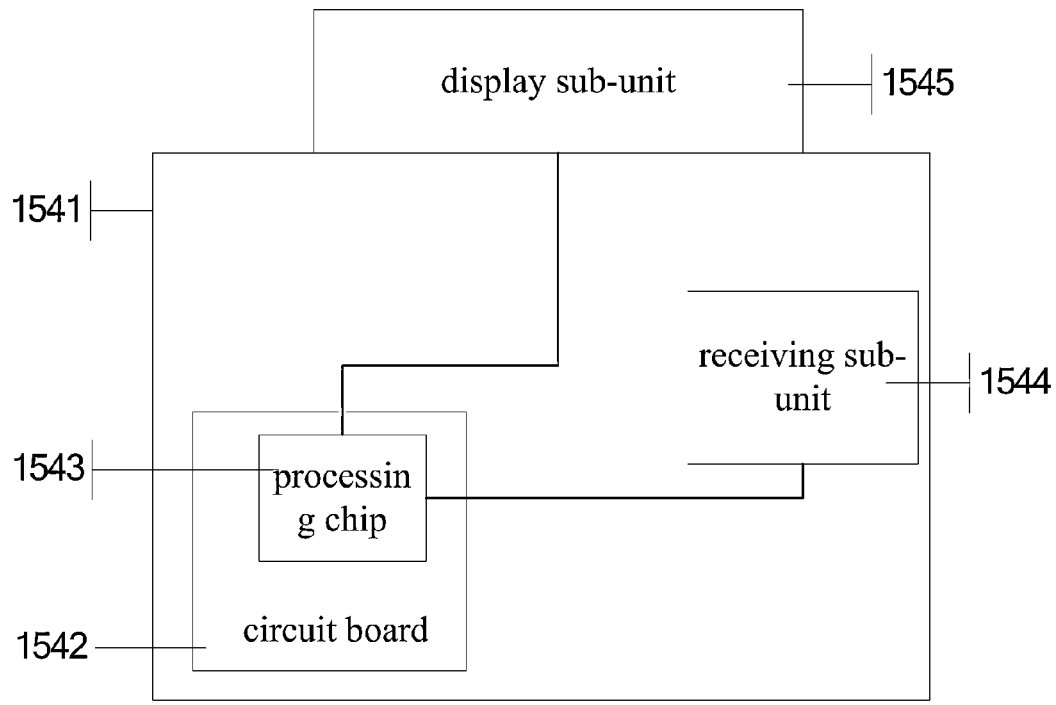
FIG. 15 is a functional module diagram of a second electronic device in the third embodiment of the invention.

The fourth example of the third embodiment of the invention also provides an electronic device connected with a first electronic device, and the first electronic device has at least a rest state and a moving state. Referring to FIG. 15, which is a functional module diagram of an electronic device provided by this embodiment, the electronic device includes: a housing 1541; a circuit board 1542 arranged in the housing; a processing chip 1543 arranged on the circuit board; a receiving sub-unit 1544 arranged in the housing and connected with the processing chip, for receiving first information and second information sent from the first electronic device, where the first information is acquired by a first sensor sub-unit of the first electronic device when the first electronic device is in a moving state, the second information is acquired by a second sensor sub-unit of the first electronic device when the first electronic device is in a rest state; and a display sub-unit 1545 arranged on the housing and connected with the processing chip, for displaying the first information and the second information. Where the first information is different from the second information, and the first sensor sub-unit and the second sub-unit are two separate sensor sub-units.

The receiving sub-unit 1544 may be a second wireless communication sub-unit which receives first information and second information sent from the first electronic device.

The receiving sub-unit 1544 is adapted to receive information indicating the moving state of the first electronic device in the moving state, and the display sub-unit displays the moving state information.

The receiving sub-unit 1544 is adapted to receive identification information indicating the identification of at least face of the first electronic device in the rest state, and the display sub-unit displays the identification information.

The information display method provided in the third embodiment can be applied to the electronic device provided by this embodiment. Since the implementation process of the information display method has been described in detail previously, those skilled in the art can understand the structure and implementation process of the electronic device according to the foregoing descriptions. For conciseness, the applicant will not describe this in detail.

The technical solution in the third embodiment of the invention has at least the following technical effects or advantages.

1. Since two sensors are used, with one sensor acquiring the moving state information of the electronic die in the moving state and the other sensor acquiring point information of the electronic die in the rest state, and the moving state information and the point information are displayed on an electronic device connected with the electronic die, the game is more vivid, and the game modes becomes more diverse.

2. Since two sensors are used, with one sensor acquiring the moving state information of the electronic die in the moving state and the other sensor acquiring point information of the electronic die in the rest state, the sensor does not need to perform mode switching, thus the information acquired by the sensors can be transferred to and displayed on the electronic device connected with the electronic dice quickly, thus improving the real-time of the electronic die.

Those skilled in the art should understand that the embodiment of the invention can be embodied as methods, systems, or computer program products. Accordingly, the invention can adopt the forms of a pure hardware embodiment, a pure software embodiment, or a combination of software and hardware. Moreover, the invention can adopt a form of a computer program product which is implemented on one or more computer usable storage media (including but not limited to a disk storage, and an optical memory, etc.) containing the computer usable program code.

The invention is described with reference to the method, apparatus (system), and the flowchart and/or block diagram of a computer program product according to the embodiments of the invention. It should be understood that each flowchart and/or block diagram of the flowcharts and/or block diagrams or a combination thereof can be achieved by computer program instructions. These computer program instructions can be supplied to a general purpose computer, a special purpose computer, an embedded processor or other programmable data processing apparatus to produce a machine, so that a device for implementing one or more flows in the flowcharts and/or functions specified in one or more of the block diagrams can be produced by means of the instructions executed by the computer or other programmable data processing apparatus.

These computer program instructions can also be stored in a computer-readable memory that can direct a computer or other programmable data processing apparatus to work in a specific manner, so that the instructions stored in the computer readable memory generates manufactured articles including the instruction device which implements one or more flows in the flowcharts and/or the functions specified in one or more of the block diagrams.

These computer program instructions can also be loaded to a computer or other programmable data processing apparatus, so that a series of operation steps are executed on the computer or other programmable apparatus to produce the computer-implemented processing, thus enabling the instructions executed on the computer or other programmable apparatus to provide steps for implementing one or more flows in the flowchart and/or functions specified by one or more of the block diagrams.

Although the preferred embodiments of the invention have been described, those skilled in the art can make additional variations and modifications to these embodiments once knowing the basic inventive concept of the invention. Therefore, the appended claims are intended to be construed as including the preferred embodiments and all changes and modifications that fall within the scope of the invention.

Obviously, those skilled in the art can make various modifications and variations to the invention without departing from the spirit and scope of the invention. Thus, if these modifications and variations of the invention belong to the scope defined by the claims of the invention and equivalents thereof, the invention is also intended to include these modifications and variations.

The invention claimed is:

1. An information control method, applied to a first electronic device having at least a rest state and a moving state, the method comprising:
   connecting the first electronic device with a second electronic device in response to the first electronic device switching between the rest state and the moving state;
   detecting feature information of the first electronic device according to a connection relation between the first electronic device and the second electronic device; and
   controlling the first electronic device according to the feature information.

2. The method according to claim 1, wherein the first electronic device has a housing, and the housing has at least one face, wherein:
   the detecting feature information of the first electronic device according to a connection relation between the first electronic device and the second electronic device comprises: detecting whether a first face in the at least one face is in contact with a second face of the second electronic device; in response to the first face being in contact with the second face, obtaining first parameter information of the first electronic device; and obtaining second parameter information of the second electronic device; and
   the controlling the first electronic device according to the feature information comprises: correcting the first parameter information based on the second parameter information, thereby obtaining third parameter information of the first electronic device.

3. The method according to claim 2, wherein the obtaining first parameter information of the first electronic device comprises one of:
   (a) obtaining, by a first acceleration sensor in the first electronic device, a vector direction of the first acceleration sensor; and
   (b) obtaining, by a first acceleration sensor in the first electronic device, a vector direction of the first acceleration sensor; and determining point information of the first electronic device based on the vector direction.

4. The method according to claim 2, wherein the obtaining second parameter information of the second electronic device comprises one of:
   (a) obtaining second parameter information of the second electronic device that is preset in the first electronic device; and
   (b) obtaining second parameter information of the second electronic device that is sent to the first electronic device via a communication module.

5. The method according to claim 2, wherein the second parameter information is a vector direction of a second acceleration sensor arranged in the second electronic device, or the value of an angle of the second electronic device relative to a first reference object.

6. The method according to claim 1, wherein:
   the detecting feature information of the first electronic device according to a connection relation between the first electronic device and the second electronic device comprises acquiring first information of the first electronic device; and
   the controlling the first electronic device according to the feature information comprises sending the first information to the second electronic device.

7. The method according to claim 6, wherein the step of sending the first information to the second electronic device by the first electronic device comprises one of:
   (a) the first electronic device sends the first information to the second electronic device for a first number of times, wherein a time interval between every two sendings has a first length of time;
   (b) the first electronic device stops sending the first information in response to receiving, for the first time, an acknowledge receipt message sent from the second electronic device; and
   (c) the first electronic device stops sending the first information in response to receiving, for the first time, an acknowledge receipt message sent from the second electronic device; and
   the first electronic device stops sending the first information in response to the first electronic device not receiving an acknowledge receipt message sent from the second electronic device after the first information has been sent to the second electronic device for a second number of times by the first electronic device.

8. The method according to claim 6, further comprising:
   in response to the first electronic device entering the moving state from the rest state, closing, by the first electronic device, a connection channel between the first electronic device and the second electronic device after the first electronic device sends the first information to the second electronic device.

9. The method according to claim 6, further comprising:
   in response to the first electronic device entering the rest state from the moving state, establishing a connection channel between the first electronic device and the second electronic device,
   wherein the step of sending the first information to the second electronic device by the first electronic device comprises sending, by the first electronic device, the first information to the second electronic device via the connection channel.

10. The method according to claim 9, wherein the step of establishing a connection channel between the first electronic device and the second electronic device comprises establishing a connection channel between the first electronic device and the second electronic device after the first electronic device enters the rest state from the moving state for a second length of time.

11. The method according to claim 10, wherein the step of sending, by the first electronic device, the first information to the second electronic device via the connection channel comprises sending the first information to the second electronic device via the connection channel after the first electronic device enters the rest state from the moving state for the second length of time.

12. The method according to claim 6, wherein the step of sending, by the first electronic device, the first information to the second electronic device comprises:
broadcasting the first information in a form of broadcasting,
wherein the second electronic device responds to the broadcast information after receiving the broadcast information and decodes the broadcast information to obtain the first information.

13. The method according to claim 1, wherein:
the detecting feature information of the first electronic device according to a connection relation between the first electronic device and the second electronic device comprises:
in response to the first electronic device changing from the rest state to the moving state, acquiring, by a first sensor unit of the first electronic device, first information of the first electronic device in the moving state; and
in response to the first electronic device changing from the moving state to the rest state, acquiring, by a second sensor unit of the first electronic device, second information of the first electronic device in the rest state,
wherein the second information is different from the first information, and
the controlling the first electronic device according to the feature information comprises:
in response to acquiring the first information, sending the first information to a second electronic device connected with the first electronic device; and
in response to acquiring the second information, sending the second information to the second electronic device,
wherein the first sensor unit and the second sensor unit are two separate sensor units.

14. The method according to claim 13, further comprising:
before acquiring, by a first sensor unit of the first electronic device, first information of the first electronic device in the moving state, controlling the first sensor unit so that the first sensor unit switches from a power-off state to a power-on state.

15. The method according to claim 14, further comprising:
before controlling the first sensor unit so that the first sensor unit switches from a power-off state to a power-on state, judging whether the moving state satisfies a first preset condition; and
in response to the moving state satisfying the first preset condition, controlling the first sensor unit so that the first sensor unit switches from the power-off state to the power-on state.

16. The method according to claim 13, further comprising:
before acquiring, by a second sensor unit of the first electronic device, second information of the first electronic device in the rest state, controlling the second sensor unit so that the second sensor unit switches from a power-off state to a power-on state.

17. The method according to claim 14, further comprising:
before controlling the second sensor unit so that the second sensor unit switches from a power-off state to a power-on state, judging whether the rest state satisfies a second preset condition; and in response to the rest state satisfying the second preset condition, controlling the second sensor unit so that the second sensor unit switches from a power-off state to a power-on state.

18. The method according to claim 13, wherein the sending the first information to a second electronic device connected with the first electronic device comprises one of:
(a) sending the first information to the second electronic device connected with the first electronic device via a first wireless communication unit; and
(b) sending moving state information of the first electronic device in the moving state to the second electronic device connected with the first electronic device.

19. The method according to claim 13, wherein the sending the second information to the second electronic device comprises one of:
(a) sending the second information to the second electronic device via a first wireless unit; and
(b) sending identification information of at least one face of the first electronic device in the rest state to the second electronic device.

20. An electronic device having at least a rest state and a moving state, wherein the electronic device is connected with a second electronic device in response to the electronic device switching between the rest state and the moving state, the electronic device comprising:
a detection unit, adapted to detect feature information of the electronic device according to a connection relation between the electronic device and the second electronic device; and
a control unit, adapted to control the electronic device according to the feature information.

21. The electronic device according to claim 20, wherein the electronic device has a housing, and the housing has at least one face; and wherein:
the detection unit comprises:
a contact information detecting sub-unit, adapted to detect whether a first face in the at least one face is in contact with a second face of the second electronic device;
a first obtaining sub-unit, adapted to obtain first parameter information of the electronic device in response to the first face being in contact with the second face; and
a second obtaining sub-unit, adapted to obtain second parameter information of the second electronic device; and
the control unit comprises:
a correction sub-unit, adapted to correct the first parameter information based on the second parameter information, thereby obtaining third parameter information of the electronic device.

22. The electronic device according to claim 21, wherein the first obtaining sub-unit is adapted to perform one of:
(a) obtaining, by a first acceleration sensor in the electronic device, a vector direction of the first acceleration sensor; and
(b) obtaining, by a first acceleration sensor in the electronic device, a vector direction of the first acceleration sensor; and determining point information of the electronic device based on the vector direction.

23. The electronic device according to claim 21, wherein the second obtaining sub-unit is adapted to perform one of:
(a) obtaining second parameter information of the second electronic device that is preset in the electronic device; and
(b) obtaining second parameter information of the second electronic device that is sent to the electronic device via a communication module.

24. The electronic device according to claim 20, wherein:
the detection unit comprises an acquisition sub-unit adapted to acquire first information of the electronic device; and
the control unit comprises a sending sub-unit adapted to send the first information to a second electronic device.

25. The electronic device according to claim 24, wherein the sending sub-unit is adapted to perform one of:
(a) sending the first information to the second electronic device for a first number of times, wherein a time interval of every two sendings has a first length of time;
(b) stopping the sending the first information in response to receiving, for the first time, an acknowledge receipt message sent from the second electronic device; and
(c) stopping the sending the first information in response to receiving, for the first time, an acknowledge receipt message sent from the second electronic device; and stopping the sending the first information in response to the electronic device not receiving an acknowledge receipt message sent from the second electronic device after the first information has been sent to the second electronic device for a second number of times by the electronic device.

26. The electronic device according to claim 24, further comprising:
a processing sub-unit adapted to close a connection channel between the electronic device and the second electronic device in response to the electronic device entering the moving state from the rest state.

27. The electronic device according to claim 24, further comprising:
a processing sub-unit adapted to establish a connection channel between the electronic device and the second electronic device in response to the electronic device entering the rest state from the moving state,
wherein the sending sub-unit is further adapted to send the first information to the second electronic device via the connection channel.

28. The electronic device according to claim 27, wherein the processing sub-unit is further adapted to establish a connection channel between the electronic device and the second electronic device after the electronic device enters the rest state from the moving state for a second length of time.

29. The electronic device according to claim 28, wherein the sending sub-unit is further adapted to send the first information to the second electronic device via the connection channel after the electronic device enters the rest state from the moving state for the second length of time.

30. The electronic device according to claim 24, wherein:
the sending sub-unit is further adapted to broadcast the first information in a form of broadcasting,
the second electronic device responds to the broadcast information after receiving the broadcast information, and
the second electronic device decodes the broadcast information to obtain the first information.

31. The electronic device according to claim 20, wherein:
the detection unit further comprises:
a first sensor sub-unit, adapted to acquire first information of the electronic device in the moving state; and
a second sensor sub-unit, adapted to acquire second information of the electronic device in the rest state; and
the control unit further comprises:
a sending sub-unit connected with the first sensor sub-unit and the second sensor sub-unit, for sending the first information and the second information to a second electronic device connected with the electronic device; and
a control sub-unit connected with the first sensor sub-unit, the second sub-unit, and the sending sub-unit, for controlling the sending sub-unit so that the sending sub-unit sends the first information and the second information to the second electronic device connected with the electronic device,
wherein the first information is different from the second information and the first sensor sub-unit and the second sub-unit are two separate sensor units.

32. The electronic device according to claim 31, wherein the control sub-unit is further adapted to control the first sensor sub-unit so that the first sensor sub-unit switches from a power-off state to a power-on state before the first sensor sub-unit acquires the first information of the electronic device in the moving state.

33. The electronic device according to claim 32, further comprising:
a first judgment sub-unit connected with the control sub-unit, for judging whether the moving state satisfies a first preset condition,
wherein in response to the moving state satisfying the first preset condition, the control sub-unit controls the first sensor sub-unit so that the first sensor sub-unit switches from a power-off state to a power-on state.

34. The electronic device according to claim 31, wherein:
the control sub-unit is further adapted to control the second sensor sub-unit so that the second sensor sub-unit switches from a power-off state to a power-on state before the second sensor sub-unit acquires the second information of the electronic device in the rest state, and
the first information is different from the second information.

35. The electronic device according to claim 34, further comprising:
a second judgment sub-unit connected with the control sub-unit, for judging whether the rest state satisfies a second preset condition,
wherein in response to the rest state satisfying the second preset condition, the control sub-unit controls the second sensor sub-unit so that the second sensor sub-unit switches from a power-off state to a power-on state.

36. The electronic device according to claim 31, wherein the sending sub-unit is a first wireless communication unit and is adapted to perform one of:
(a) sending the first information and the second information to the second electronic device;
(b) sending moving state information of the electronic device in the moving state to the second electronic device; and
(c) sending identification information of at least one face of the electronic device in the rest state to the second electronic device.

* * * * *

UNITED STATES PATENT AND TRADEMARK OFFICE
CERTIFICATE OF CORRECTION

PATENT NO. : 9,746,837 B2
APPLICATION NO. : 13/915136
DATED : August 29, 2017
INVENTOR(S) : Xiang Shao et al.

Page 1 of 1

It is certified that error appears in the above-identified patent and that said Letters Patent is hereby corrected as shown below:

In the Specification
At Column 2, Line 11, delete "die" and insert --dice--
At Column 11, Line 17, delete "dice" and insert --die--
At Column 27, Line 16, delete "dice" and insert --die--
At Column 34, Line 40, delete "dice" and insert --die--

In the Claims
At Column 41, Claim 17, Line 63, delete "14" and insert --16--

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*